(12) United States Patent
Zeng et al.

(10) Patent No.: US 11,545,901 B1
(45) Date of Patent: Jan. 3, 2023

(54) CONTROL SYSTEM FOR BUCK CONVERTER

(71) Applicant: University of Macau, Macau (CN)

(72) Inventors: Wenliang Zeng, Macau (CN); Chi Seng Lam, Macau (CN); Sai Weng Sin, Macau (CN); Weng Keong Che, Macau (CN); Rui Paulo Da Silva Martins, Macau (CN); Ran Ding, Macau (CN)

(73) Assignee: University of Macau, Taipa (CN)

( * ) Notice: Subject to any disclaimer, the term of this patent is extended or adjusted under 35 U.S.C. 154(b) by 0 days.

(21) Appl. No.: 17/370,188

(22) Filed: Jul. 8, 2021

(51) Int. Cl.
*H02M 3/158* (2006.01)
*H02M 1/00* (2006.01)
*H02M 1/08* (2006.01)

(52) U.S. Cl.
CPC ......... *H02M 3/158* (2013.01); *H02M 1/0032* (2021.05); *H02M 1/0041* (2021.05); *H02M 1/083* (2013.01)

(58) Field of Classification Search
CPC ............. H02M 1/0032; H02M 1/0035; H02M 1/0041; H02M 1/083; H02M 3/158; H02M 3/1582; H02M 3/156; H02M 3/1563
See application file for complete search history.

(56) References Cited

U.S. PATENT DOCUMENTS

| | | | | |
|---|---|---|---|---|
| 6,724,174 B1* | 4/2004 | Esteves | ................. | H02M 3/155 323/224 |
| 2005/0116697 A1* | 6/2005 | Matsuo | ............... | H02M 3/1584 323/282 |
| 2008/0030178 A1* | 2/2008 | Leonard | ................ | H02M 3/156 323/282 |
| 2009/0079408 A1* | 3/2009 | Qiao | ................... | H02M 3/1588 323/283 |

* cited by examiner

*Primary Examiner* — Nguyen Tran
(74) *Attorney, Agent, or Firm* — Casimir Jones, S.C.; Tanya A. Arenson

(57) ABSTRACT

The present disclosure provides a control system of a buck converter, relating to the field of Internet of Things. The control system of a buck converter provided in an embodiment of the present disclosure includes a first control module, a second control module, and a mode selector. The first control module is turned on and the second control module is turned off through an analog current sensor in the mode selector when an IoT device switches from a transmission mode to a sleep mode or a standby mode, so that the first control module outputs a first voltage pulse to the driving and level shifter module, wherein a frequency of the first voltage pulse is determined by a frequency of a first clock in the first control module, and a width of the first voltage pulse is determined by a frequency of a second clock in the first control module.

20 Claims, 16 Drawing Sheets

CONTROL SYSTEM FOR BUCK CONVERTER

TECHNICAL FIELD

The present disclosure relates to the technical field of Internet of Things, in particular to a control system for a buck converter.

BACKGROUND ART

With the development of science and technology, the applications of the Internet of Things (IoT) devices are becoming more and more extensive. It is estimated that in the near future, the IoT devices connected through the Internet will be more than 20 billion. The IoT devices are generally battery powered so as to be capable of continuously monitoring and collecting data in a physical environment during operation. Therefore, prolonging the service time of the battery is of important significance for improving the service life of the IoT.

The IoT devices generally use a power management unit to manage the battery, and a DC-DC (direct current-direct current) converter in the battery management unit can effectively output a fixed voltage after converting an input voltage, thus playing an important role in prolonging the service time of the battery. Generally, the range of load current of the IoT devices is large in different operation modes, such as sleep mode, standby mode, and transmission mode, and therefore, inductor-based DC-DC converters are more popular in such IoT device applications.

However, the existing inductor-based DC-DC converters will consume high quiescent current when the IoT devices are in the sleep mode or the standby mode, and cannot be adapted to a wide load current range or a wide input voltage range.

SUMMARY

In view of this, the present disclosure aims at providing a control system for a buck converter, so as to reduce a quiescent current consumed by IoT devices when being in a sleep mode or a standby mode, and be capable of being adapted to a wider load current range and a wider input voltage range.

A control system for a buck converter provided in the present disclosure includes: a first control module, a second control module, a mode selector, a driving and level shifter module, a power stage module, an inductor, a voltage stabilizing module, an inductor current zero-crossing detecting (ZCD) module, and a voltage source, wherein the first control module is connected to the voltage source, the mode selector, and the driving and level shifter module, respectively;

the second control module is connected to the voltage source, the mode selector, and the driving and level shifter module, respectively;

the mode selector is further connected to the driving and level shifter module and the voltage source, respectively; the driving and level shifter module is further connected to the power stage module and the inductor current zero-crossing detecting module; the power stage module is further connected to the inductor, the inductor current zero-crossing detecting module, and a voltage input terminal, respectively; the inductor is further connected to a voltage output terminal, the first control module, and the second control module; a voltage stabilizing module has one terminal connected to the inductor, and the other terminal grounded; and the voltage source is further connected to the voltage input terminal;

the first control module is configured to output a first voltage pulse to the driving and level shifter module when an IoT device is in the sleep mode or the standby mode, a frequency of the first voltage pulse is determined by a frequency of a first clock in the first control module, and a width of the first voltage pulse is determined by a frequency of a second clock in the first control module;

the second control module is configured to output a second voltage pulse to the driving and level shifter module when the IoT device is in the transmission mode, and the frequency of the second voltage pulse is constant;

the mode selector is configured to detect an operating mode of the IoT device, turn off the first control module and turn on the second control module through a digital current sensor when the IoT device is switched from the sleep mode or the standby mode to the transmission mode, and turn on the first control module and turn off the second control module through a first voltage comparator corresponding to an analog current sensor corresponding to the digital current sensor when the IoT device is switched from the transmission mode to the sleep mode or the standby mode;

the driving and level shifter module is configured to control a switching frequency of the power stage module according to the first voltage pulse or the second voltage pulse, so as to cooperate with the inductor to convert an input voltage of the voltage input terminal to an output voltage;

the voltage stabilizing module is configured to reduce a ripple of the output voltage;

the inductor current zero-crossing detecting module is configured to detect whether a current of the inductor reaches a zero-crossing position, so as to modify the time of the voltage pulse of the power stage module through the driving and level shifter module, so that the current passing through the inductor is not continuously conducted; and the voltage source is configured to provide a constant voltage to the first control module or the second control module according to the input voltage of the voltage input terminal.

Optionally, in a specific embodiment, the first control module includes: a first feedback sub-module, a first control sub-module, and a clock sub-module;

the first feedback sub-module is configured to provide a first feedback voltage to the first control sub-module;

the first control sub-module is configured to control the clock sub-module according to the first feedback voltage and a reference voltage provided by the voltage source; and the clock sub-module is configured to generate the first clock and the second clock.

Optionally, in a specific embodiment, the first control sub-module includes: a clock-controlled comparator and an exclusive OR gate;

a positive input terminal of the clock-controlled comparator is connected to the reference voltage source, a negative input terminal of the clock-controlled comparator is connected to the first feedback sub-module, a clock-controlled terminal of the clock-controlled comparator is connected to an output terminal of the exclusive OR gate, and an output terminal of the clock-controlled comparator is connected to the clock sub-module;

an input terminal of the exclusive OR gate is connected to the clock sub-module; and the clock-controlled terminal of the clock-controlled comparator is configured to turn on or turn off the clock-controlled comparator, and the clock-controlled comparator is configured to compare the reference voltage with the first feedback voltage, output "high" when the first feedback voltage is less than the reference voltage, and output "low" when the first feedback voltage is greater than the reference voltage.

Optionally, in a specific embodiment, the clock sub-module includes: a first clock generator, an AND gate, and a second clock generator;

one input terminal of the AND gate is connected to the clock-controlled comparator, the other input terminal of the AND gate is connected to the mode selector, an output terminal of the AND gate is connected to the second clock generator, and the second clock generator is connected to one input terminal of the exclusive OR gate;

the first clock generator is connected to the other input terminal of the exclusive OR gate; and the first clock generator is configured to generate the first clock; and the second clock generator is configured to generate the second clock.

Optionally, in a specific embodiment, the second control module includes: a second feedback sub-module and a second control sub-module;

the second feedback sub-module is configured to provide a second feedback voltage to the second control sub-module; and the second control sub-module is configured to output the second voltage pulse according to the second feedback voltage and the reference voltage provided by the voltage source.

Optionally, in a specific embodiment, the second control sub-module includes: a second voltage comparator and an error amplifier;

one input terminal of the second voltage comparator is connected to an output terminal of the error amplifier, the other input terminal of the second voltage comparator is connected to a superposition signal of a gain signal of an input current and a third clock signal, and an output terminal of the second voltage comparator is configured to output a second voltage pulse; and one input terminal of the error amplifier is connected to the voltage source, and the other input terminal of the error amplifier is connected to the second feedback sub-module.

Optionally, in a specific embodiment, a mode selector includes: a counter, a selector, an OR gate, a first NOT gate, a second NOT gate, a first voltage comparator, and a voltage divider network;

the counter is connected to two input ends of the selector;

an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal for turning on the first control module and turning off the second control module;

an input terminal of the first NOT gate is connected to an output terminal of the second NOT gate;

an input terminal of the second NOT gate is connected to an output terminal of the first voltage comparator; and one input terminal of the first voltage comparator is connected to one terminal of the voltage divider network, and the other input terminal of the first voltage comparator is connected to a sampling signal of the current of the inductor.

Optionally, in a specific embodiment, the counter is a plurality of cascaded D flip-flops.

Optionally, in a specific embodiment, the voltage source includes a bandgap reference and low dropout voltage regulators, and the voltage source provides a constant voltage to the first control module or the second control module through the bandgap reference and the low dropout voltage regulators.

Optionally, in a specific embodiment, the low dropout voltage regulators include a first low dropout voltage regulator and a second low dropout voltage regulator, the voltage source provides a constant voltage to the first control module through the bandgap reference and the first low dropout voltage regulator, and the voltage source provides a constant voltage to the second control module through the bandgap reference and the second low dropout voltage regulator.

In the control system for a buck converter provided the embodiments of the present disclosure, the first control module is turned off and the second control module is turned on through the counter or the digital current sensor in the mode selector when the IoT device is switched from the sleep mode or the standby mode to the transmission mode, and the first control module is turned on and the second control module is turned off through the first voltage comparator corresponding to the analog current sensor in the mode selector when the IoT device is switched from the transmission mode to the sleep mode or the standby mode, thus reducing the consumed quiescent current when the IoT device is in a sleep mode or a standby mode, and being able to be adapted to a wider load current range and a wider input voltage range.

In order to make the above objectives, features, and advantages of the present disclosure more apparent and understandable, preferred embodiments are particularly illustrated below in combination with attached accompanying drawings to make following detailed description.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation on the scope, and those ordinarily skilled in the art still could obtain other relevant drawings according to these accompanying drawings, without using any creative efforts.

Figure 1:
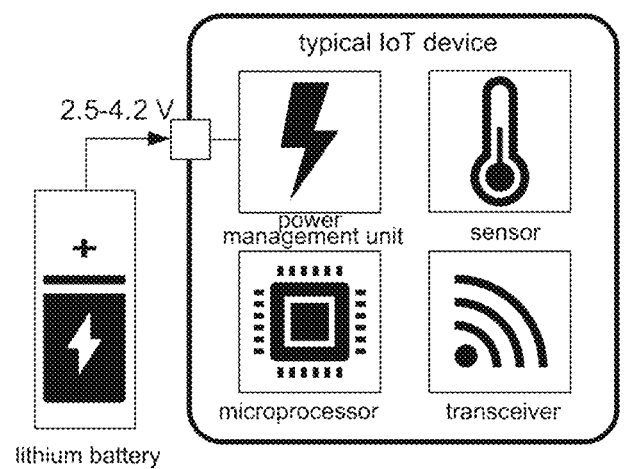
FIG. 1 shows a structural schematic view of an IoT device provided in an embodiment of the present disclosure.

Reference signs of main elements: first control module 10, first feedback sub-module 101, first control sub-module 102, clock-controlled comparator 112, exclusive OR gate 122, clock sub-module 103, first clock generator 133, AND gate 123, second clock generator 113, second control module 20, second feedback sub-module 201, second control sub-module 202, second voltage comparator 212, error amplifier 222, mode selector 30, counter 301, D flip-flop 311, selector 302, OR gate 303, first NOT gate 304, second NOT gate 305, first voltage comparator 306, voltage divider network 307, driving and level shifter module 40, power stage module 50, inductor 60, voltage source 70, bandgap reference 701, low dropout voltage regulators 702, first low dropout voltage regulator 712, second low dropout voltage regulator 722, voltage input terminal 80, voltage output terminal 90, voltage stabilizing module 100, inductor current zero-crossing detecting module 110.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, the embodiments described are merely some but not all embodiments of the present disclosure. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope of the present disclosure claimed, but merely illustrates chosen embodiments of the present disclosure. All of other embodiments obtained by a person skilled in the art based on the embodiments of the present disclosure without using creative efforts shall fall within the scope of protection of the present disclosure.

Before the embodiments of the present disclosure are described in detail, an application scenario of the present disclosure will be described first.

With the development of science and technology, the applications of the IoT devices are also becoming more and more extensive. The IoT devices are generally battery powered so as to be capable of continuously monitoring and collecting data in a physical environment in operation. Referring to FIG. 1, a typical IoT device generally includes a power management unit, a transceiver for communication, a microprocessor unit, and a sensor, and a lithium ion battery is a reliable power supply option for the IoT system, with a voltage range of 2.5 V to 4.2 V. An ultra-low-power-consumption (quiescent current is several hundred nA) DC-DC converter in the power management unit plays an important role in prolonging the service time of the battery. According to a load current curve of the power management unit, the IoT device can be divided into three operating modes: 1. a sleep mode, corresponding to a load current in the order of magnitude of nA to µA; 2. a standby mode, corresponding to a load current in the order of magnitude of µA to mA; and 3. a transmission mode, corresponding to a load current in the order of magnitude of mA to hundreds of mA. Therefore, due to the very wide load current range in these three operating modes, compared with DC-DC converters based on switched capacitors, inductor-based DC-DC converters are more popular in this IoT device application. In fact, the IoT devices are in the sleep mode most of the time, with a current consumption ranging from hundreds of nA to tens of µA. When environmental data is collected by a sensor, a microprocessor reads and processes the data, which process consumes a current of hundreds of µA to a few mA, which is called as a standby mode. After that, the data will be transmitted from different communication channels to the Internet via the transceiver, which consumes a current of several tens of mA in a short period of time, which is called as a transmission mode.

Therefore, the DC-DC converter in the IoT application should consume an ultra-low quiescent current in the sleep mode, can be adapted to a wider load current range (nA-mA), and can provide a fast load transient response in the range of nA/μA to mA when converting from one mode to another. In addition, the DC-DC converter should also operate normally in a wider input voltage range due to the drop in voltage of the lithium ion battery during use.

However, the existing inductor-based DC-DC converters will consume a higher quiescent current when the IoT devices are in a sleep mode or a standby mode, and cannot be adapted to a wider load current range and a wider input voltage range.

Therefore, the present disclosure provides a control system for a buck converter, which can reduce the quiescent current consumed when the IoT devices are in a sleep mode or a standby mode, and can be adapted to a wider load current range and a wider input voltage range.

Figure 2:
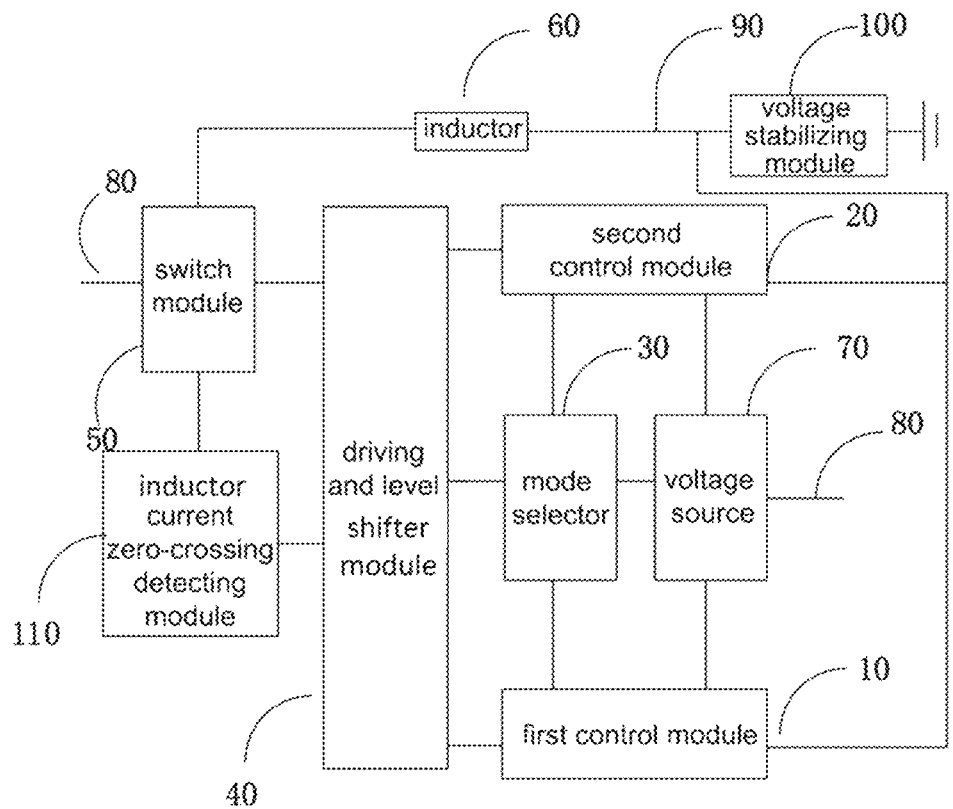
FIG. 2 shows a schematic view of a control system for a buck converter provided in an embodiment of the present disclosure.

Referring to FIG. 2, a control system for a buck converter provided in the present disclosure includes: a first control module 10, a second control module 20, a mode selector 30, a driving and level shifter module 40, a power stage module 50, an inductor 60, a voltage stabilizing module 100, an inductor current zero-crossing detecting module 110, and a voltage source 70; the first control module 10 is connected to the voltage source 70, the mode selector 30, and the driving and level shifter module 40, respectively; the second control module 20 is connected to the voltage source 70, the mode selector 30, and the driving and level shifter module 40, respectively; the mode selector is further connected to the driving and level shifter module 40 and the voltage source 70, respectively; the driving and level shifter module 40 is further connected to the power stage module 50 and the inductor current zero-crossing detecting module 110; the power stage module 50 is further connected to the inductor 60, the inductor current zero-crossing detecting module 110, and a voltage input terminal 80, respectively; the inductor 60 is further connected to a voltage output terminal 90, the first control module 10, and the second control module 20; a voltage stabilizing module 100 has one terminal connected to the inductor 60, and the other terminal grounded; the voltage source 70 is further connected to the voltage input terminal 80; the first control module 10 is configured to output a first voltage pulse to the driving and level shifter module 40 when the IoT device is in the sleep mode or the standby mode, a frequency of the first voltage pulse is determined by a frequency of a first clock in the first control module 10, and a width of the first voltage pulse is determined by a frequency of a second clock in the first control module 10; the second control module 20 is configured to output a second voltage pulse to the driving and level shifter module 40 when the IoT device is in the transmission mode, and a frequency of the second voltage pulse is constant; the mode selector 30 is configured to detect an operating mode of the IoT device, turn off the first control module 10 and turn on the second control module 20 through a counter 301 or a digital current sensor when the IoT device is switched from the sleep mode or the standby mode to the transmission mode, and turn on the first control module 10 and turn off the second control module 20 through a first voltage comparator 306 corresponding to the analog current sensor in the mode selector when the IoT device is switched from the transmission mode to the sleep mode or the standby mode; the driving and level shifter module 40 is configured to control a switching frequency of the power stage module 50 according to the first voltage pulse or the second voltage pulse, so as to cooperate with the inductor 60 to convert an input voltage of the voltage input terminal 80 to an output voltage; the voltage stabilizing module 100 is configured to reduce a ripple of the output voltage; the inductor current zero-crossing detecting module 110 is configured to detect whether a current of the inductor 60 reaches a zero-crossing position, so as to modify the time of the voltage pulse of the power stage module 50 through the driving and level shifter module 40, so that the current passing through the inductor 60 is not continuously conducted; and the voltage source 70 is configured to provide a constant voltage to the first control module 10 or the second control module 20 according to the input voltage of the voltage input terminal 80.

In an embodiment of the present disclosure, the first control module 10 is a double clock time (DCT) control module, that is, a DCT control module, and a control mode of the first control module 10 is a DCT control mode, that is, a DCT mode, and the second control module 20 is a pulse width modulation (PWM) control module, that is, a PWM control module, and a control mode of the PWM control module, that is, a PWM mode, which will not be described in detail in the following description.

In an embodiment of the present disclosure, the inductor current zero-crossing detecting module 110 is a ZCD control module hereinafter, which will not be described in detail in the following description.

In an embodiment of the present disclosure, when the load current ranges from nA to mA, the first control module 10 is started to perform buck conversion; and when the load current ranges from mA to 50 mA, the second control module 20 is started to perform buck conversion.

In an embodiment of the present disclosure, taking into consideration the maximum load current of 50 mA and the power inductor of 2.2 pH, the buck converter mainly operates in a discontinuous conduction mode (DCM) when the IoT device is in the sleep mode, the standby mode, and the transmission mode.

In an embodiment of the present disclosure, a type II compensator is applied to the second control module 20. When the IoT device operates in the sleep mode or the standby mode, the second control module 20 will be turned off completely to reduce the power consumption.

In an embodiment of the present disclosure, when the load current is smaller, that is, when the IoT device is in the sleep mode or the standby mode, the first control module 10 operates, and the second control module 20 is powered off, so as to realize a low quiescent current.

In an embodiment of the present disclosure, the voltage stabilizing module 100 may be a capacitor.

Figure 3:
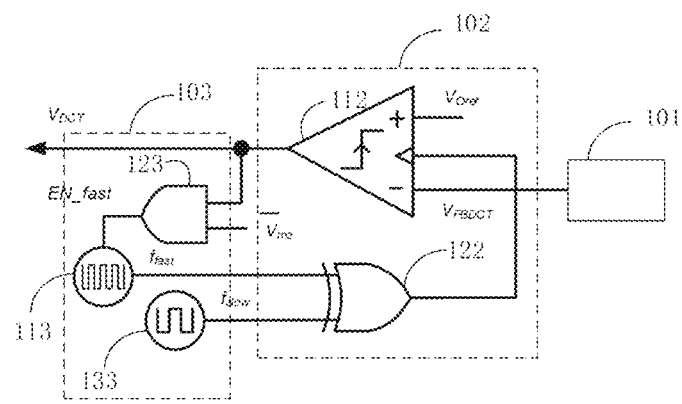
FIG. 3 shows a structural schematic view of a first control module provided in an embodiment of the present disclosure.

Referring to FIG. 3, optionally, in a specific embodiment, the first control module 10 includes: a first feedback sub-module 101, a first control sub-module 102, and a clock sub-module 103; the first feedback sub-module 101 is configured to provide a first feedback voltage to the first control sub-module 102; the first control sub-module 102 is configured to control the clock sub-module 103 according to the first feedback voltage and a reference voltage provided by the voltage source 70; and the clock sub-module 103 is configured to generate the first clock and the second clock.

Optionally, in a specific embodiment, the first control sub-module 102 includes: a clock-controlled comparator 112 and an exclusive OR gate 122; a positive input terminal of the clock-controlled comparator 112 is connected to the reference voltage source 70, a negative input terminal of the clock-controlled comparator 112 is connected to the first feedback sub-module 101, a clock-controlled terminal of the clock-controlled comparator 112 is connected to an output terminal of the exclusive OR gate 122, and an output terminal of the clock-controlled comparator 112 is connected to the clock sub-module 103; an input terminal of the exclusive OR gate 122 is connected to the clock sub-module 103; the clock-controlled terminal of the clock-controlled comparator 112 is configured to turn on or turn off the clock-controlled comparator 112, and the clock-controlled comparator 112 is configured to compare the reference voltage with the first feedback voltage, output "high" when the first feedback voltage is less than the reference voltage, and output "low" when the first feedback voltage is greater than the reference voltage.

Optionally, in a specific embodiment, the clock sub-module 103 includes: a first clock generator 133, an AND gate 123, and a second clock generator 113; one input terminal of the AND gate 123 is connected to the clock-controlled comparator 112, the other input terminal of the AND gate 123 is connected to the mode selector 30, an output terminal of the AND gate 123 is connected to the second clock generator 113, and the second clock generator 113 is connected to one input terminal of the exclusive OR gate 122; the first clock generator 133 is connected to the other input terminal of the exclusive OR gate 122; the first clock generator 133 is configured to generate the first clock; and the second clock generator 113 is configured to generate the second clock.

In an embodiment of the present disclosure, the first control module 10 is a dynamic clock driving control for the purpose of power saving, therefore the quiescent current is proportional to the frequency of the control clock. The first control module 10 includes two clocks: the first clock and the second clock, wherein the second clock is a fast clock, a frequency of the fast clock is $f_{fast}=1/t_{fast}$, the first clock is a slow clock, and a frequency of the slow clock is $f_{slow}=1/t_{slow}$. In the above, the frequency of the first clock, i.e., the frequency of the slow clock, is the frequency of the control clock of the first control module 10.

The operation principle of the first control module 10 is described below.

In the conventional constant conduction time control and adaptive conduction time control, it has been proved that a control loop is inherently stable in the discontinuous conduction mode. Since the operation principle of the first control module 10 proposed in the embodiment of the present disclosure is similar to the constant conduction time control and the adaptive conduction time control, it may be predicted that the control loop of the first control module 10 in the embodiment of the present disclosure is stable in the discontinuous conduction mode. In the first control module 10, the first clock is always in an operation state. When an output feedback voltage $V_{FBDCT}$ of a feedback resistance network of the first feedback sub-module 101 at a rising edge of $f_{slow}$ is less than $V_{Oref}$, it indicates that $V_{DCT}$="1" operated by the second clock is enabled. Therefore, the inductor 60L starts to magnetize, and the output voltage $V_{OUT}$ of the voltage output terminal 90 increases, indirectly indicated by the output feedback voltage $V_{FBDCT}$ herein. Then, the $V_{DCT}$ remains "1", and the clock-controlled comparator 112 will detect the next rising edge of the second clock. At a second rising edge of the second clock, once $V_{FBDCT}>V_{Oref}$, then $V_{DCT}$="0", the inductor 60L starts to demagnetize, and the second clock is turned off. As a result, the shortest conduction time $t_{on\_min}$ of the PMOS transistor in the power stage module 50 is equal to $t_{fast}$. Thereafter, $V_{OUT}$ ($V_{FBDCT}$) slowly decreases until $V_{FBDCT}<V_{Oref}$, then the control cycle is repeated.

The switching frequency $f_{DCT}$ of the first control module 10 is not equal to $f_{slow}$. However, the relationship between the two can be written as:

$$f_{DCT} = \frac{f_{slow}}{m}$$

Figure 4:
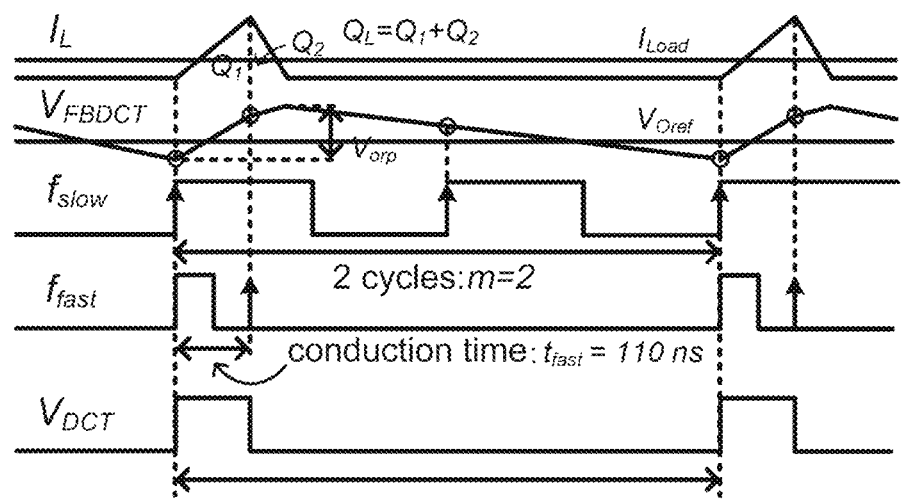
FIG. 4 shows a working waveform of the first control module, in a standby mode, provided in an embodiment of the present disclosure.
Figure 5:
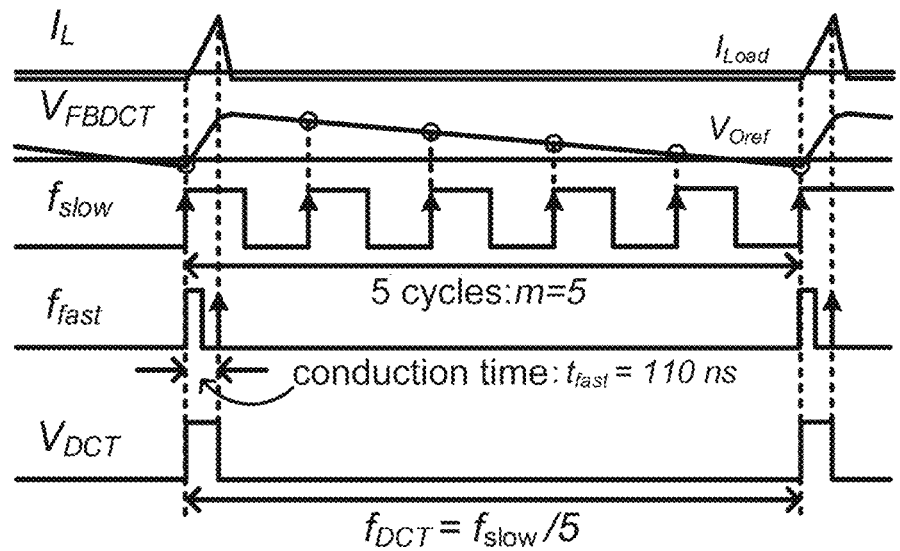
FIG. 5 shows a working waveform of the first control module, in a sleep mode, provided in an embodiment of the present disclosure.

In the above, m≥1, being an integer, that is, the maximum switching frequency in the first control module 10 is $f_{slow}$. When the load current $I_{Load}$ decreases, m increases, then $f_{DCT}$ decreases from $f_{slow}$. Referring to FIG. 4, until two $f_{slow}$ cycles, the $V_{FBDCT}$ is not less than $V_{Oref}$, therefore switching frequency $f_{DCT}$ of the first control module 10 is $f_{slow}/2$. Referring to FIG. 5, as the load current $I_{Load}$ is smaller, until five $f_{slow}$ cycles, $V_{FBDCT}$ is not less than $V_{Oref}$, therefore the switching frequency $f_{DCT}$ of the DCT control is $f_{slow}/5$.

How to determine the frequency of the second clock is described below.

The second clock period $t_{fast}$ is the shortest PMOS conduction time of the first control module 10. When the load current is smaller, as shown in FIG. 4, the magnitude of the ripple $V_{orp}$ depends on a total charge delivered to an output capacitor, and the total charge is equal to a total charge $Q_L$ demagnetized from the inductor, as shown in FIG. 5. The charge $Q_1$ during the magnetization stage of the inductor is expressed as:

$$Q_1 = \frac{(V_{IN} - V_{OUT})t_{on}^2}{2L}$$

Then the total charge $Q_L$ may then be expressed as:

$$Q_L = \frac{Q_1}{M} = \frac{(V_{IN} - V_{OUT})t_{on}^2}{2ML}$$

In the above, $M=V_{OUT}/V_{IN}$, being a voltage conversion gain, and the voltage ripple may be expressed as:

$$V_{orp} = \frac{Q_L - I_{Load}(t_{on} + t_{off})}{C_{OUT}}$$

In the above, $t_{off}$ is a demagnetization stage of the inductor. As all of $I_{Load}$, $t_{on}$ and $t_{off}$ are very small, a product $I_{Load}(t_{on}+t_{off})$ can be ignored here. The voltage ripple may be derived as:

$$V_{orp} = \frac{Q_L}{C_{OUT}} = \frac{V_{IN}(1-M)t_{on}^2}{2MLC_{OUT}}$$

Using the known $V_{orp}$ and $t_{on}=t_{fast}$, the $t_{fast}$ is solved to be:

$$t_{fast} = \sqrt{\frac{2V_{orp}MLC_{OUT}}{V_{IN}(1-M)}}$$

The maximum voltage ripple occurs at a time point when M is the smallest (i.e., $V_{OUT}$=0.8 V and $V_{IN}$=5 V). When an acceptable voltage ripple is $V_{orp}$=15 mV, L=2.2 µH, and $C_{OUT}$=4.7 µF, $t_{fast}$ is found to be 110 ns. In an embodiment of the present disclosure, the $t_{fast}$ is designed to be 110 ns. Note that the second clock in an embodiment of the present disclosure may be implemented using a conventional oscillator circuit.

How to determine the frequency of the first clock in an embodiment of the present disclosure is described below.

In the first control module 10, the clock-controlled comparator 112 monitors the output voltage at the rising edge of the first clock, and further the $C_{OUT}$ is charged. Thereafter, in the discontinuous conduction mode stage, the $C_{OUT}$ is discharged by the load current $I_{Load}$. In the buck converter, the voltage ripple may also be expressed as:

$$V_{orp} = \frac{I_{Load} t_{DCM}}{C_{OUT}}$$

Figure 6:
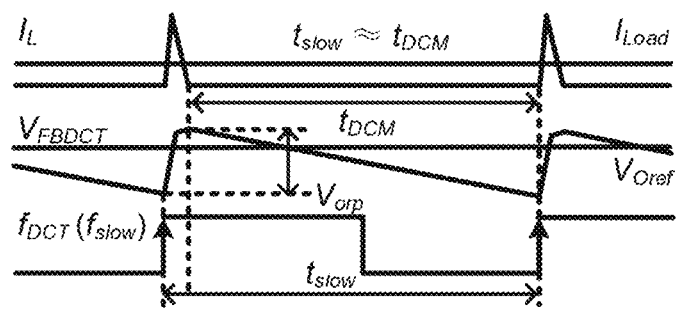
FIG. 6 shows a working waveform of the first control module, when a load current is relatively large, provided in an embodiment of the present disclosure.

Referring to FIG. 6, the $t_{DCM}$ is the duration of the discontinuous conduction mode stage when the inductor current $I_L$ is 0. When $I_{Load}$ is sufficiently large, m=1, and it can be seen from the preceding that $f_{DCT}=f_{slow}$, then we can assume that $t_{DCM} \approx t_{slow}$, then the voltage ripple $V_{orp}$ becomes:

$$V_{orp} = \frac{I_{Load} t_{DCM}}{C_{OUT}} \approx \frac{I_{Load} t_{slow}}{C_{OUT}}$$

Finally, the frequency $f_{slow}$ of the first clock may be obtained:

$$f_{slow} = \frac{I_{Load}}{C_{OUT} V_{orp}}$$

When $I_{Load}$ is 50 mA, $C_{OUT}$ is 4.7 µF, and an acceptable "voltage ripple" $V_{orp}$ is 25 mV, $f_{slow}$=424 kHz. Obviously, the first control module 10 is not designed for processing the case with the maximum $I_{Load}$=50 mA, but we need to ensure that the first control module 10 can detect a sudden step change from light load to heavy load, and $V_{orp}$ herein represents a part of undershoot voltage when the buck converter is switched from the first control module 10 to the second control module 20.

Figure 7:
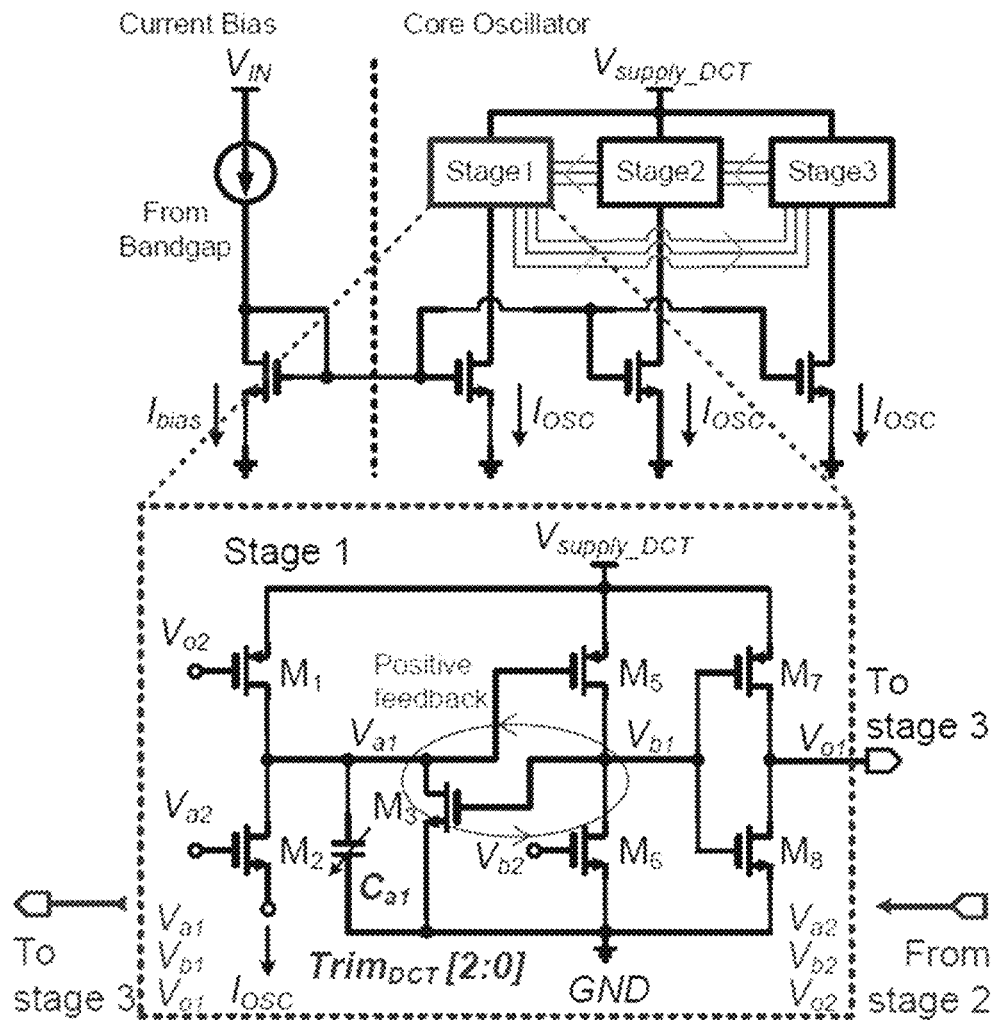
FIG. 7 shows an architectural schematic view of a slow clock oscillator provided in an embodiment of the present disclosure.

Referring to FIG. 7, in the present study, a first clock oscillator circuit, i.e. the first clock generator 133, can be realized by designing a trimming circuit, and this circuit realizes quite low power consumption in each cycle through an additional positive feedback loop.

Finally, a trimming capacitor $C_{a1}$ is utilized to design the $f_{slow}$ to about 400 kHz, and the dynamic quiescent current consumed by the oscillator is 200 nA. The signal $\text{Trim}_{DCT}$ [2:0] is designed to trim the clock frequency for the process-voltage-temperature by adjusting the $C_{a1}$ value.

How to determine the switching frequency of the first control module 10 will be described below.

In a steady state, the switching frequency $f_{DCT}$ is related to $I_{Load}$ and the total charge $Q_L$ demagnetized from the inductor in each cycle. Then by means of formula (3), it is obtained that:

$$f_{DCT} = \frac{1}{t_{DCT}} = \frac{I_{Load}}{Q_L} = \frac{2LMI_{Load}}{V_{IN}(1-M)(t_{fast})^2}$$

When $V_{IN}$=2 V, $V_{OUT}$=0.8 V, M=0.4, $I_{Load}$=100 nA, and L=2.2 µH, we obtain $f_{DCT} \approx$12 Hz. As the buck converter may operate in the sleep mode at a frequency of $f_{DCT} \approx$12 Hz, the proposed first control module 10 may realize an ultra-low quiescent current. When $V_{IN}$=3.6 V, $V_{OUT}$=1 V, M=0.28, and $I_{Load}$=10 mA, $f_{DCT}$=338 kHz<$f_{slow}$ (400 kHz), this means that the first control module 10 may operate in a wider load current range. Finally, the switching frequency $f_{DCT}$ of the first control module 10 has been proved in the preceding to vary according to the load current $I_{Load}$ in the first control module 10. When the calculated $f_{DCT}$ is greater than $f_{slow}$, this means that the load current exceeds the range of DCT control, and thus the design criterion for switching the converter from the DCT mode to the PWM mode to operate will be described later.

Figure 8:
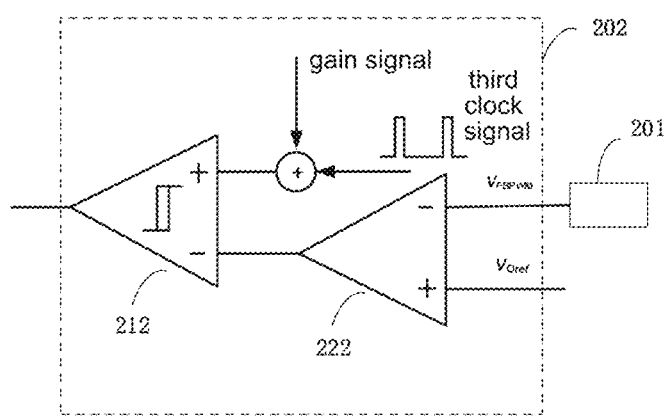
FIG. 8 shows a schematic view of a second control module provided in an embodiment of the present disclosure.

Referring to FIG. 8, optionally, in a specific embodiment, the second control module 20 includes: a second feedback sub-module 201 and a second control sub-module 202; the second feedback sub-module 201 is configured to provide a second feedback voltage to the second control sub-module 202; and the second control sub-module 202 is configured to output a second voltage pulse according to the second feedback voltage and the reference voltage provided by the voltage source 70.

Optionally, in a specific embodiment, the second control sub-module 202 includes: a second voltage comparator 212 and an error amplifier 222; one input terminal of the second voltage comparator 212 is connected to an output terminal of the error amplifier 222, the other input terminal of the second voltage comparator 212 is connected to a superposition signal of a gain signal of an input current and a third clock signal, and an output terminal of the second voltage comparator 212 is configured to output a second voltage pulse; and one input terminal of the error amplifier 222 is connected to the voltage source 70, and the other input terminal of the error amplifier 222 is connected to the second feedback sub-module 201.

Figure 9:
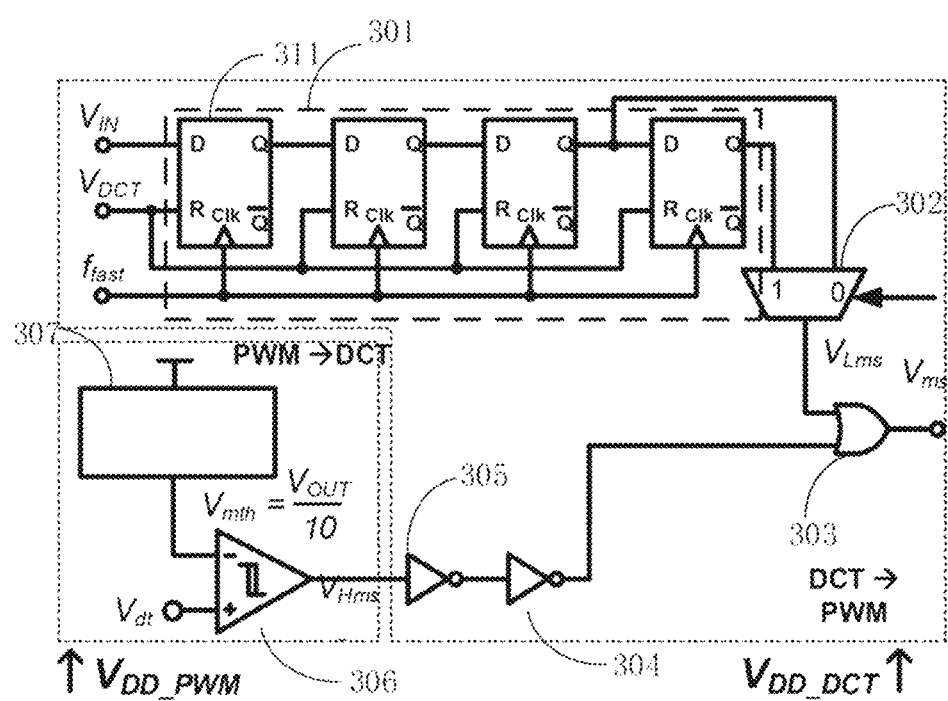
FIG. 9 shows a circuit schematic view of a mode selector provided in an embodiment of the present disclosure.

Referring to FIG. 9, optionally, in a specific embodiment, the mode selection module (mode selector) includes: a counter 301, a selector 302, an OR gate 303, a first NOT gate 304, a second NOT gate 305, a first voltage comparator 306, and a voltage divider network 307; the counter 301 is connected to an input terminal of the selector 302; an output terminal of the selector 302 is connected to one input terminal of the OR gate 303, the other input terminal of the OR gate 303 is connected to an output terminal of the first NOT gate 304, and an output terminal of the OR gate 303 is configured to output a control signal for turning off the first control module 10 and turning on the second control module 20, or to output a control signal for turning on the first control module 10 and turning off the second control module 20; an input terminal of the first NOT gate 304 is connected to an output terminal of the second NOT gate 305; an input terminal of the second NOT gate 305 is connected to an output terminal of the first voltage comparator 306; one input terminal of the first voltage comparator 306 is connected to one terminal of the voltage divider network 307, and the other input terminal of the first voltage comparator 306 is connected to a sampling signal of the current of the inductor 60.

Optionally, in a specific embodiment, the counter 301 is a plurality of cascaded D flip-flops 311.

A process of switching from the first control module 10 to the second control module 20 will be described in detail below.

The first control module 10 must have a current sensor to complete the mode conversion function. In the sleep mode, detecting a light load current with an analog current sensor will consume too much static power. Therefore, in an embodiment of the present disclosure, a digital ultra-low-power-consumption "current sensor" is proposed for the first control module 10. The circuit is based on the counter 301 established by cascading several D flip-flops 311 (DFF), and the quiescent current consumed by the circuit is almost zero. As described in the preceding, when the load current $I_{Load}$ is too large, the second clock $f_{fast}$ may operate multiple times to address this situation. That is, the conduction time of the PMOS transistor of the power stage module 50 increases, and becomes:

$$t_{on} = (N-1)t_{fast} = nt_{fast}$$

In the above, N≥2, being the number of D flip-flops 311 used, and n=N−1, being the number of cycles of operation of the second clock. As n can be counted using the counter 301 in FIG. 9, n can reflect the magnitude of the load current. Thus, the selected number N of D flip-flops 311 may be used as a design criterion for the conversion of the first control module 10 to the second control module 20. As a result, in the proposed first control module 10, a simple counter 301 can be used as a digital current sensor.

Figure 10:
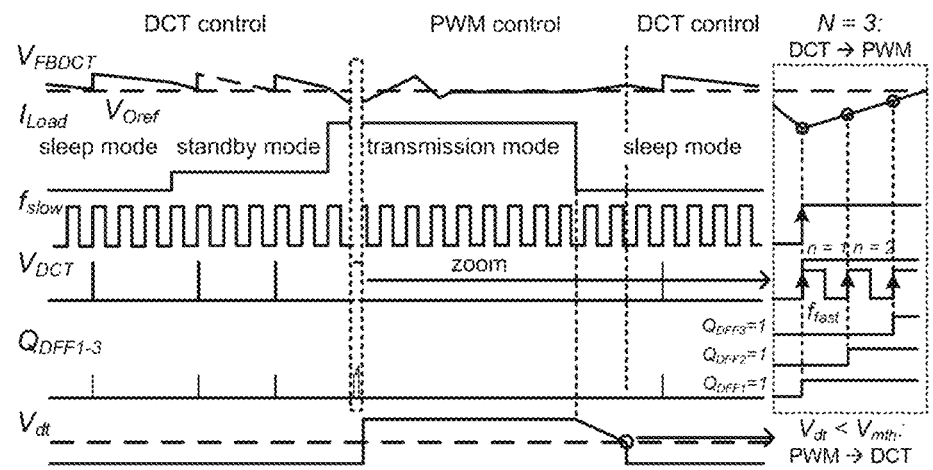
FIG. 10 shows a working waveform for mode transition in the control system for a buck converter provided in an embodiment of the present disclosure.

Referring to FIG. 10, when the load current changes from the standby mode to the transmission mode, the feedback output voltage $V_{FBDCT}$ will decrease rapidly. At the rising edge of the first clock ($f_{slow}$), if the clock-controlled comparator 112 detects $V_{FBDCT} < V_{Oref}$, it outputs $V_{DCT}$="1". Then, the second clock ($f_{fast}$) is triggered and $Q_{DFF1}$="1", the conduction time of the PMOS transistor of the power stage module 50 will be $t_{fast}$, the output capacitor $C_{OUT}$ is charged, and $V_{FBDCT}$ starts to rise. Thereafter, at a rising edge of the second cycle of the second clock, $Q_{DFF2}$="1", if the clock-controlled comparator 112 detects that $V_{FBDCT}$ is still less than $V_{Oref}$, the conduction time of the PMOS will be $2t_{fast}$. Finally, at a rising edge of a third cycle of the second clock, $Q_{DFF3}$="1", if the clock-controlled comparator 112 detects that $V_{FBDCT}$ is still less than $V_{Oref}$, then $V_{ms}$="1". Then, the second control module 20 starts, and the buck converter is switched to the second control module 20 to operate.

Given that different $V_{IN}$ and $V_{OUT}$ will affect a load current upper limit in the mode selection, the number of D flip-flops 311 is selected by a multiplexer, wherein when $V_{OUT}$=0.8 V, 1 V, and 1.2 V, N=3, and when $V_{OUT}$=1.8 V and 3 V, N=4.

The switching from the second control module 20 to the first control module 10 is described in detail below.

Figure 11:
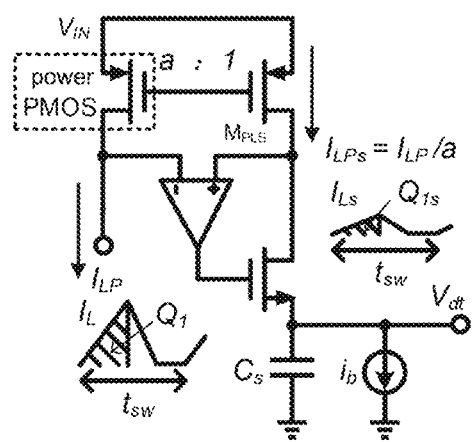
FIG. 11 shows a schematic view of a current sensing circuit in the second control module provided in an embodiment of the present disclosure.

In the second control module 20, a conventional analog current sensing circuit having a filter capacitor may be adopted in an embodiment of the present disclosure. Referring to FIG. 11, the current $I_{LP}$ of the PMOS transistor of the power stage module 50 is sensed by a current mirror $I_{LPs}$, and is converted into a voltage signal $V_{dt}$ by a filter capacitor $C_s$ and a small DC current $i_b$. Thereafter, $V_{dt}$ is compared with a threshold voltage $V_{mth}$ (wherein the $V_{mth}$ varies with the $V_{OUT}$ design value). When $V_{dt} > V_{mth}$, $V_{ms}$="1", LDO_PWM remains on, and the buck converter continues to operate under the control of the second control module 20. However, when $V_{dt} < V_{mth}$, $V_{ms}$="0", LDO_PWM is off, and the buck converter is switched to the first control module 10 to operate.

In the second control module 20, the relationship or transfer function between $V_{dt}$ and $I_{Load}$ is critical for design, because it determines the load current level for switching the buck converter from the control mode of the second control module 20 to the control mode of the first control module 10, which can be deduced from FIG. 11. First, an equivalent charge sensed from the inductor 60L during magnetization is described as:

$$Q_{1S} = \int_0^{t_{sw}} I_{LPs}(t)dt = \frac{\int_0^{t_{sw}} I_{Lp}(t)}{a} dt = \frac{Q_1}{a}$$

In the above, a is a current mirror ratio, and $t_{sw}$ is a PWM switching frequency, then the sensed charge Qis may also be described as:

$$Q_{1s} = \frac{MQ_L}{a} = \frac{MI_{Load}t_{sw}}{a}$$

The voltage $V_{dt}$ may be derived from the total charge flowing into the filter capacitor $C_s$.

$$V_{dt} = \frac{Q_{1s} - i_b t_{sw}}{C_s} = \frac{Mt_{sw}\left(\frac{I_{Load}}{a} - i_b\right)}{C_s}$$

The relationship or transfer function between $V_{dt}$ and $I_{Load}$ may thus be obtained, which helps to design the criterion for switching from the control mode of the second control module 20 to the control mode of the first control module 10.

The stability problem of the mode selector 30 will be described below.

Figure 12:
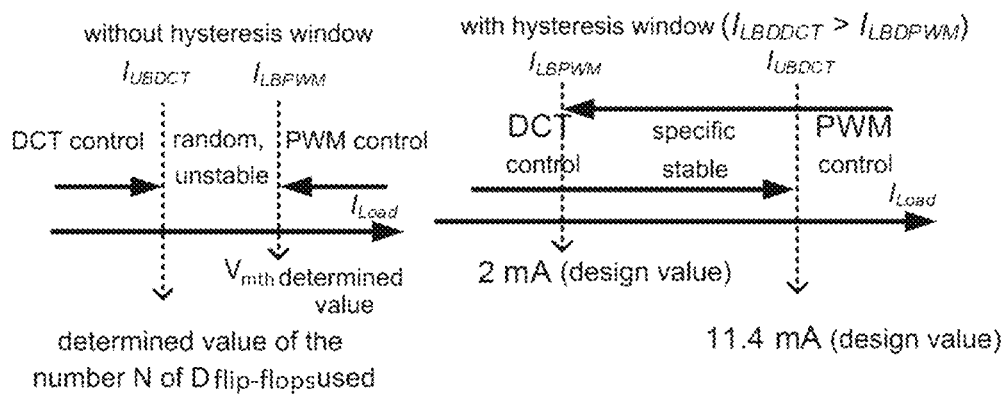
FIG. 12 shows a schematic view of a mode boundary current between a DCT mode and a PWM mode, with and without a hysteresis window, provided in an embodiment of the present disclosure.

In the scenario of mode selection, if the hysteresis current window is not realized, referring to FIG. 12, when $I_{UBDCT} < I_{Load} < I_{LBPWM}$, the buck converter may be quickly switched between the control mode of the first control module 10 and the control mode of the second control module 20, wherein $I_{UBDCT}$ is an upper limit of the load current of the first control module 10, and $I_{LBPWM}$ is a lower limit of the load current controlled by the second control module 20. When designing $I_{LBPWM} < I_{UBDCT}$, the hysteresis current window may be formed so as to ensure stability during the mode transition.

Next, we will determine the values of $I_{UBDCT}$ and $I_{LBPWM}$. As described in the preceding, the criteria for selection from the control mode of the first control module 10 to the control mode of the second control module 20 and from the control mode of the second control module 20 to the control mode of the first control module 10 depend on the number N of D flip-flops 311 used in the counter 301 (we will analyze the case with N=3 below) and the value of $V_{mth}$, respectively.

Figure 13:
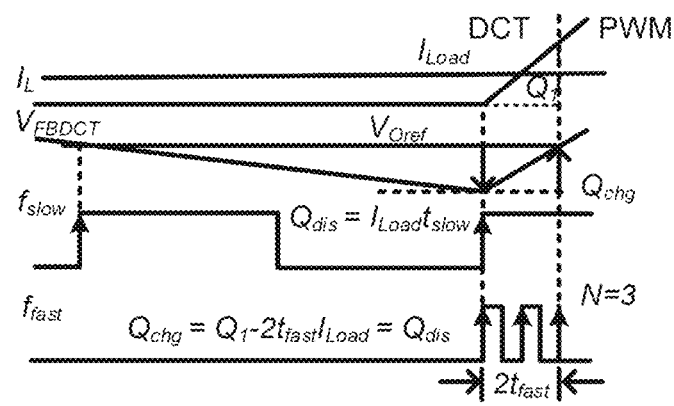
FIG. 13 shows a waveform voltage drop diagram during transition from the DCT mode to the PWM mode provided in an embodiment of the present disclosure.

Referring to FIG. 13, during the transition from the control mode of the first control module 10 to the control mode of the second control module 20, the maximum voltage drop occurs in the following situations: 1. the output capacitor $C_{OUT}$ discharges for a complete $t_{slow}$ cycle through $I_{Load}$; 2. the first control module 10 operates and the output capacitor is charged by the inductor $60Q_1$ until N=3 (n=2), in turn, the converter changes to the control mode of the second control module 20. A boundary current $I_{UBDCT}$ can be determined by assuming $Q_{chg} = Q_{dis}$.

$$Q_1 = I_{UBDCT}\left(\frac{1}{f_{slow}} + \frac{2}{f_{fast}}\right) \approx \frac{I_{UBDCT}}{f_{slow}}$$

Then $I_{UBDCT}$ may be solved by formula (2):

$$I_{UBDCT} = \frac{f_{slow}(V_{IN} - V_{OUT})(nt_{fast}))^2}{2L}$$

In cases where $V_{IN}$=3.6 V, $V_{OUT}$=1 V, and n=2, the upper limit $I_{UBDCT}$ of the load current of the first control module 10 is 11.44 mA.

During the transition from the second control module 20 to the first control module 10, the lower limit $I_{LBPWM}$ of the load current controlled by the second control module 20 may be solved by setting $V_{dt}=V_{mth}$. We design $V_{mth}=V_{OUT}/10$ here so as to prevent changes caused by different output voltages, then:

$$I_{LBPWM} = a\left(\frac{V_{IN}C_s f_{sw}}{10} + i_b\right)$$

In the above, $f_{sw}$=2.5 MHz, being the switching frequency of the second control module 20. These analog parameters a, $C_s$, and $i_b$ can then be designed to satisfy the condition of the current hysteresis window. When a=2000, $V_{IN}$=3.6 V, $C_s$=1 pF, and when $i_b$=100 nA, $I_{LBPWM}$=2 mA.

Figure 14:
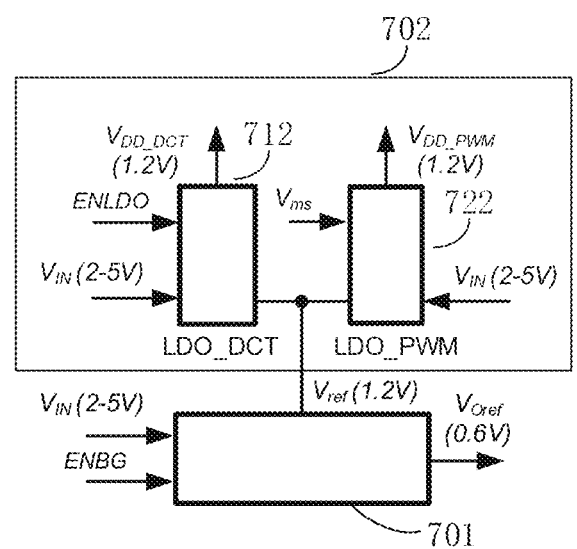
FIG. 14 shows a structural schematic view of a voltage source provided in an embodiment of the present disclosure.

Referring to FIG. 14, optionally, in a specific embodiment, the voltage source 70 includes a bandgap reference 701 and low dropout voltage regulators 702, and the voltage source 70 provides a constant voltage to the first control module 10 or the second control module 20 through the bandgap reference 701 and the low dropout voltage regulators 702.

Optionally, in a specific embodiment, the low dropout voltage regulators 702 includes a first low dropout voltage regulator 712 and a second low dropout voltage regulator 722, the voltage source 70 provides a constant voltage to the first control module 10 through the bandgap reference 701 and the first low dropout voltage regulator 712, and the voltage source 70 provides a constant voltage to the second control module 20 through the bandgap reference 701 and the second low dropout voltage regulator 722.

It should be indicated that ENBG is an enable signal of the bandgap reference 701, and ENLDO is an enable signal of the buck converter and the low-power-consumption low dropout voltage regulators 702 functioning in both DCT and PWM control modes. As a complete system, the designed buck converter requires only one input voltage source 70$V_{IN}$ in the test environment. In this design, an input power supply voltage $V_{IN}$ is considered to be 2 V to 5 V. In an embodiment of the present disclosure, in order to reduce the complexity of the control circuit in the wide $V_{IN}$ range, a dedicated constant voltage power supply is designed for the first control module 10 and the second control module 20. To this end, the low-power-consumption bandgap and the low dropout voltage regulators 702 are designed. For the logic design in the driving and level shifter module 40, 5V thick oxide NMOS transistor should be able to be conducted completely (wherein a maximum threshold voltage $V_{thmax}$=1.1 V in the process) due to the voltage $V_{DD\_X}$((subscript "X" stands for PWM or DCT). Therefore, the voltage source 70$V_{DD\_X}$ for DCT and PWM control is designed to be 1.2 V.

The bandgap reference 701 generates a reference voltage $V_{ref}$=1.2 V for the first low dropout voltage regulator 712 and the second low dropout voltage regulator 722, and the half voltage divider generates an output reference voltage $V_{Oref}$=0.6 V. The main purpose of using the low dropout voltage regulators 702 is to fix the power supply voltage of the control circuit over a wider input voltage range (2-5 V) so that the error amplifier 222, the comparator, a delay generator, the first/second clock generator and other corresponding control circuits are much less sensitive to power supply voltage changes. Since the bandgap reference 701 circuit ($V_{ref}$=1.2 V) cannot provide any driving capability, the low dropout voltage regulators 702 are required to provide the driving capability for the control circuit. Specifically, a fixed 1.2 V power supply will reduce the change of the oscillation frequency of the slow clock generator, which plays a crucial role in minimizing the quiescent current of the controller. Since the low dropout voltage regulators 702 will output a control voltage of 1.2 V for the control circuit, thin oxide transistors also may be used instead of thick oxide transistors even if the input voltage range varies between 2 V and 5 V.

When ENBG="1", the bandgap reference 701 circuit starts to operate. LDO_DCT is the low-power-consumption low dropout voltage regulator 712 that functions in both DCT and PWM control modes, whose output $V_{DD\_DCT}$ provides a voltage/power for the DCT control module as well as part of gate driver signals. The maximum current of LDO_DCT is 40 nA, therefore, even if there is a larger dropout voltage, the power loss in the LDO is very small. LDO_PWM is a normal-power low dropout voltage regulator 722 that operates only in PWM control mode, whose output $V_{DD\_PWM}$ provides a voltage/power to the PWM control module. When the load current is larger, LDO_PWM is enabled by a mode selection signal $V_{ms}$. When ENLDO="1", the buck converter starts to operate and adjust the output voltage so as to track the reference voltage thereof. Different output voltages may be set by controlling a feedback resistance network with $V_{OSW[2:0]}$. We can measure the quiescent current of the buck converter by setting ENBG="1" and ENLDO="1", and meanwhile we can measure a turning-off current of the buck converter by setting ENBG="0".

Figure 15:
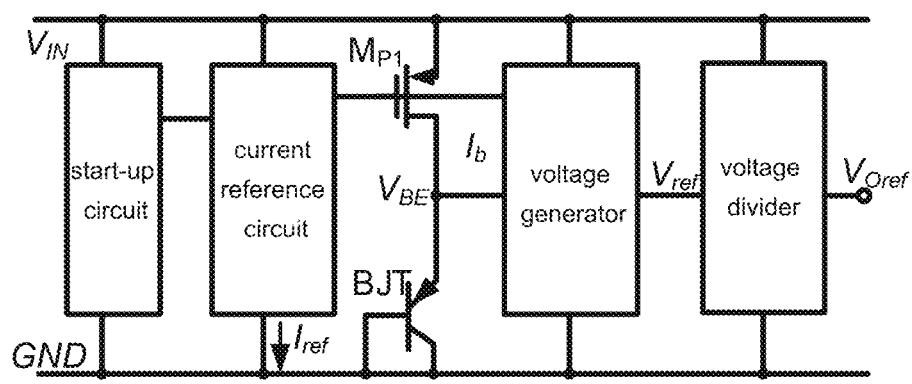
FIG. 15 shows an architectural view of a nanoampere level bandgap reference circuit provided in an embodiment of the present disclosure.

In an embodiment of the present disclosure, the $V_{ref}$(=1.2 V) generated is constant under conditions of different input/output ranges, PVT changes, load current conditions, etc. In order to achieve an ultra-low quiescent current, the current consumption of the bandgap reference 701 should be as low as possible. Referring to FIG. 15, FIG. 15 shows architecture of a nanoampere level bandgap reference 701 circuit, which circuit includes a startup circuit, a current reference circuit, a bipolar junction transistor, a voltage generator proportional to an absolute temperature, and a voltage divider. $V_{Oref}$ is a reference value of the output voltage of the buck converter generated by the half voltage divider.

Figure 16:
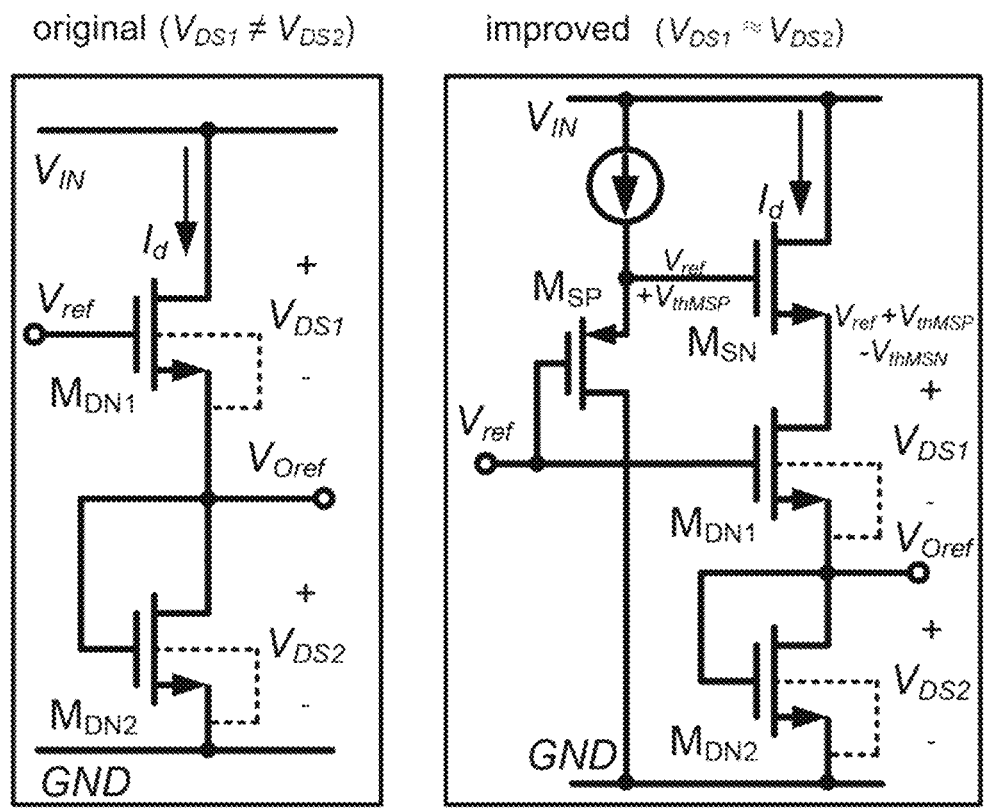
FIG. 16 shows an architectural view of an original half voltage divider circuit and an improved half voltage divider circuit in the nanoampere level bandgap reference provided in an embodiment of the present disclosure.

Referring to FIG. 16, in the original half voltage divider circuit, when both $M_{DN1}$ and $M_{DN2}$ are in a saturation region, the current can be easily expressed as:

$$I_d = \frac{1}{2}\mu_n C_{OX}\frac{W}{L}(V_{GS1} - V_{TH})^2(1 + \lambda V_{DS1})$$

$$I_d = \frac{1}{2}\mu_n C_{OX}\frac{W}{L}(V_{GS2} - V_{TH})^2(1 + \lambda V_{DS2})$$

In the above, $\mu_n$ is carrier mobility, Cox is a gate oxide unit capacitance, W/L is an aspect ratio, is a channel length modulation coefficient, $V_{DS1}=V_{IN}-V_{Oref}$, $V_{GS1}=V_{ref}-V_{Oref}$, and $V_{DS2}=V_{GS2}=V_{Oref}$. Since magnitudes of $M_{DN1}$ and $M_{DN2}$ are the same, threshold voltages $V_{TH}$ thereof are also the same. Then, $V_{ref}$ and $V_{Oref}$ are solved to be:

$$(V_{ref}-V_{Oref}-V_{TH})^2(1+\lambda V_{DS1})=(V_{Oref}-V_{TH})^2(1+\lambda V_{DS2})$$

When a difference between $V_{DS1}$ and $V_{DS2}$ is small, $V_{ref} \approx 2V_{Oref}$ can be obtained. However, in an embodiment of the present disclosure, since $V_{IN}$ changes from 2 V to 5 V, $V_{DS1}$ (4.4 V when $V_{IN}$=5 V) is quite different from $V_{DS2}$ (0.6V), the channel length modulation effect cannot be ignored. FIG. 16 also shows an improved half voltage divider proposed in an embodiment of the present disclosure. Compared with the original circuit, there exist two source followers $M_{SP}$ and $M_{SN}$ so as to try to obtain the following condition:

$$V_{DS1} \approx V_{DS2} = V_{Oref}$$

Finally, the channel length modulation effect is ignored, and an expected result can be achieved:

$$V_{ref} \approx 2V_{Oref}$$

Figure 17:
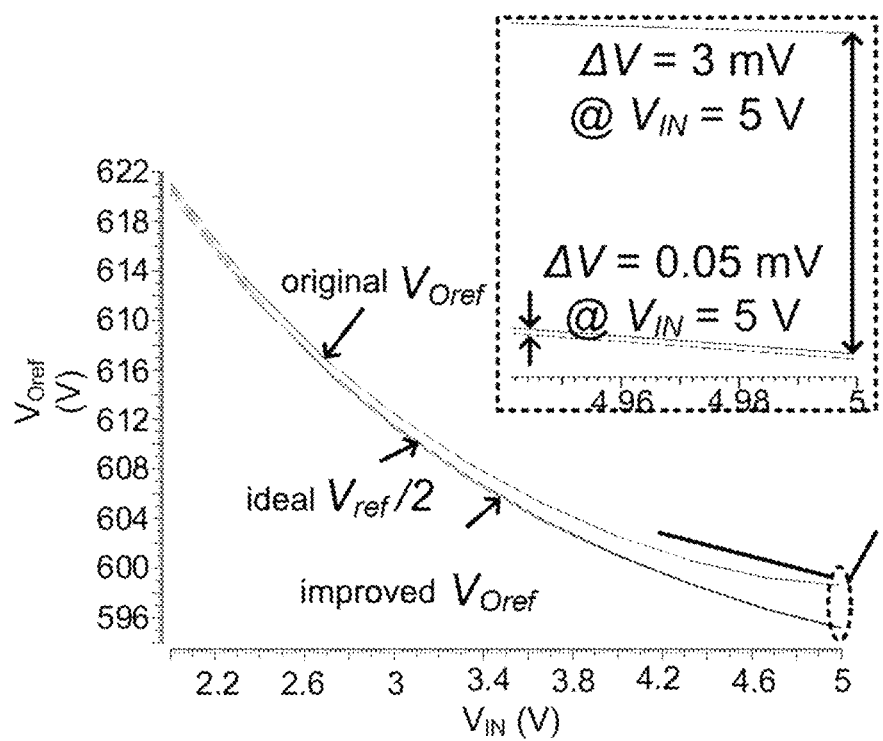
FIG. 17 shows an ideal $V_{Oref}$ waveform, an original $V_{Oref}$ waveform, and an improved $V_{Oref}$ waveform simulated for $V_{IN}$ changing from 2 V to 5 V provided in an embodiment of the present disclosure.

Referring to FIG. 17, FIG. 17 shows an ideal output waveform, an original output waveform, and an improved output waveform of the half voltage divider for different input voltages $V_{IN}$. As can be seen from FIG. 17, at a point of $V_{IN}$=5 V, a difference between an ideal case and an original case is 3 mV, and a difference between the ideal case and an improved case is only 0.05 mV. This verifies that the improved voltage divider circuit is more consistent with the ideal case.

Figure 18:
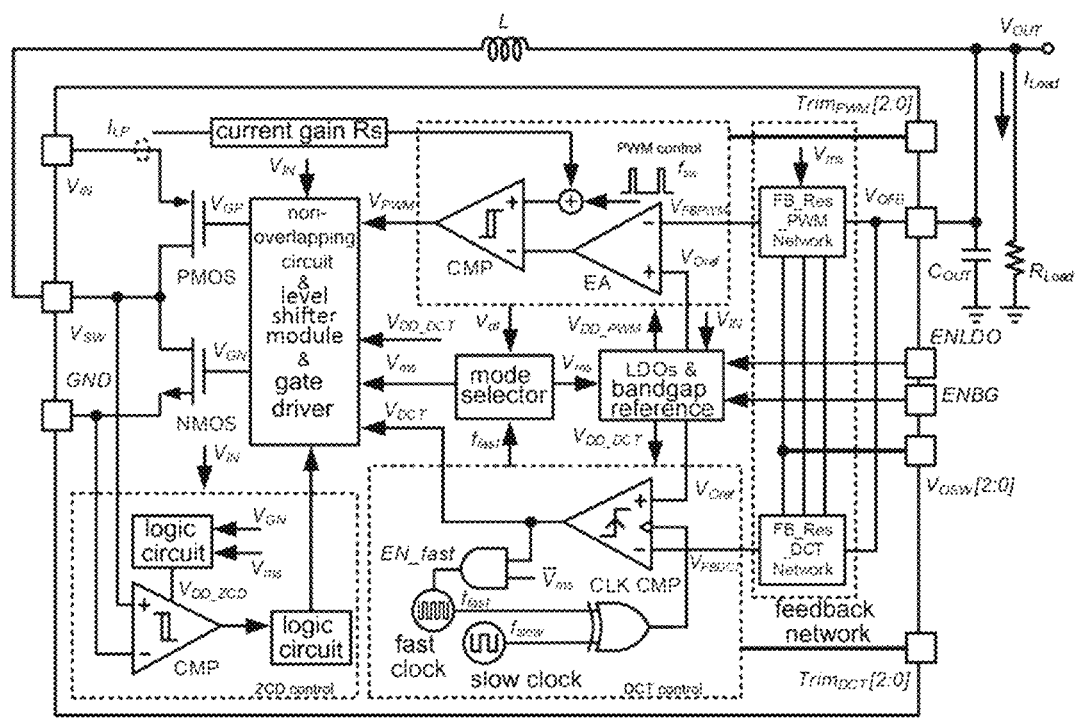
FIG. 18 shows another schematic view of the control system for a buck converter provided in an embodiment of the present disclosure.

Referring to FIG. 18, FIG. 18 is another structural schematic view of the control system for a buck converter provided in an embodiment of the present disclosure. The converter includes a buck converter having a power inductor 60L and an output capacitor $C_{OUT}$, DCT and PWM control modules, a bandgap reference 701 buffered by low dropout voltage regulators 702 (LDO), and a feedback resistance network, wherein the low dropout voltage regulators 702 provides pure reference source and power supply for DCT and PWM control, zero current detection (ZCD) control, a mode selection circuit, a non-overlapping circuit, a driving and level shifter module 40, and a gate driver.

Names of elements in FIG. 18 are described below. In FIG. 18, the DCT control and the FB_Res_DCT Network are the first control module 10, wherein the FB_Res_DCT Network is a first feedback sub-module 101, the PWM control and the FB_Res_PWM Network are a second control module 20, and wherein the FB_Res_PWM Network is a second feedback sub-module 201, a fast clock is a second clock generator 113, a slow clock is a first clock generator 133, LDOs & bandgap reference 701 are a voltage source 70, wherein the LDOs are the low dropout voltage regulators 702, CLK CMP in the DCT control is a clock-controlled comparator 112, and EA in the PWM control is an error amplifier 222, CMP in the PWM control is a second voltage comparator 212, a capacitor is a voltage stabilizing module 100, and a level shifter module & a gate driver are a driving and level shifter module 40, PMOS and NMOS are a power stage module 50, $V_{IN}$ is an input voltage, $V_{OUT}$ is an output voltage, L is an inductor 60, ZCD control is an inductor current zero-crossing detecting module 110, and the inductor current zero-crossing detecting module 110 includes a third voltage comparator and two logic circuits.

The low-power-consumption ZCD control concept "adaptive ZCD power supply" is applied to the present study, in which the ZCD circuit operates only during the demagnetization stage of the inductor in the DCT control. Through the adaptive ZCD power supply technology, the power consumption of the ZCD control can be significantly reduced and proportional to the load current, and only a very short period of time is always occupied in the case of the sleep mode. In addition, an ultra-low-power-consumption feedback resistance network, i.e., FB_res_DCT network, is designed for DCT control in consideration of a design target of low power consumption. The magnitude of the FB_res_DCT network is several tens of MΩ, and the magnitude of the feedback resistance network for PWM control, that is, FB_res_PWM network, is several hundreds of kΩ. A signal $Trim_{DCT}[2:0]$ is a 3-bit trimming signal for a DCT slow clock frequency, and a signal $Trim_{PWM}[2:0]$ is a 3-bit trimming signal for a PWM clock frequency. In the present study, the signal $V_{OSW}[2:0]$ is configured to set different output voltages 0.8 V, 1 V, 1.2 V, 1.8 V, and 3 V.

When the load current is smaller, the buck converter operates under the DCT control, and all modules related to the PWM control are powered off, so as to realize a low quiescent current. That is, in the DCT mode, an analog current sensing circuit, a PWM control module, LDO_PWM, and FB_Res_PWM_network are turned off. On the other hand, when the load current is larger, the converter operates under the PWM control, and only the DCT control module is turned off.

Figure 19:
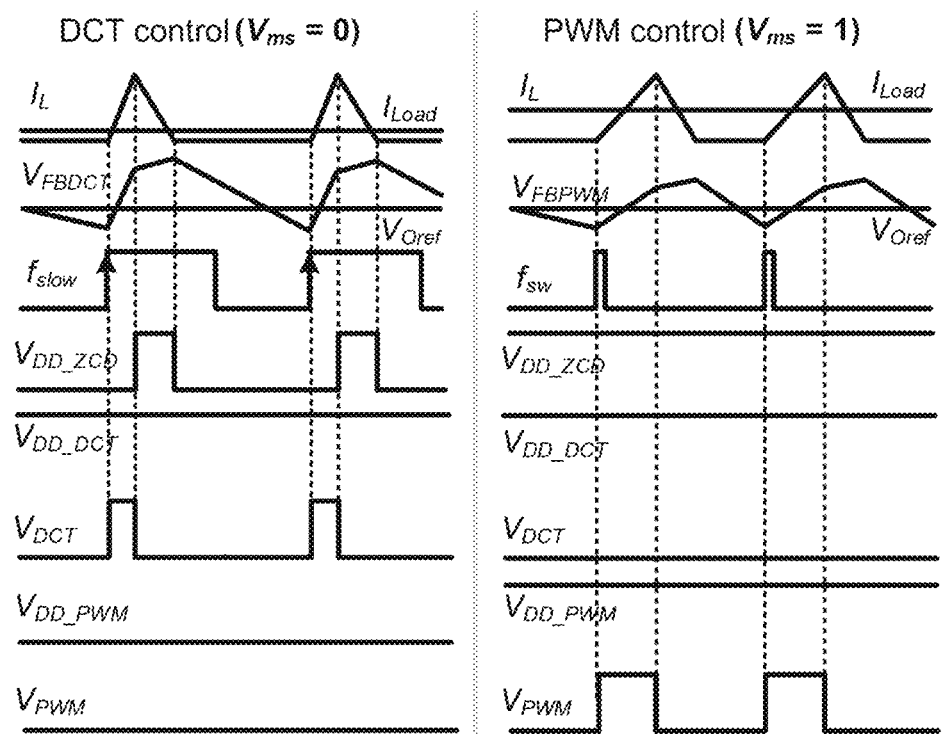
FIG. 19 shows a working waveform of DCT control and PWM control provided in an embodiment of the present disclosure.

Referring to FIG. 19, FIG. 19 shows a working waveform under the DCT and PWM control. In the DCT control, $V_{ms}$="0", in the demagnetization stage of the inductor, $V_{DD\_ZCD}$="1", $V_{DD\_DCT}$="1", $V_{DD\_PWM}$="0", $V_{DCT}$ is triggered, and $V_{PWM}$="0". In the PWM control, $V_{ms}$="1", $V_{DD\_ZCD}$="1", $V_{DD\_DCT}$="1", $V_{DD\_PWM}$="1", $V_{DCT}$="0" and $V_{PWM}$ is triggered.

Figure 20:
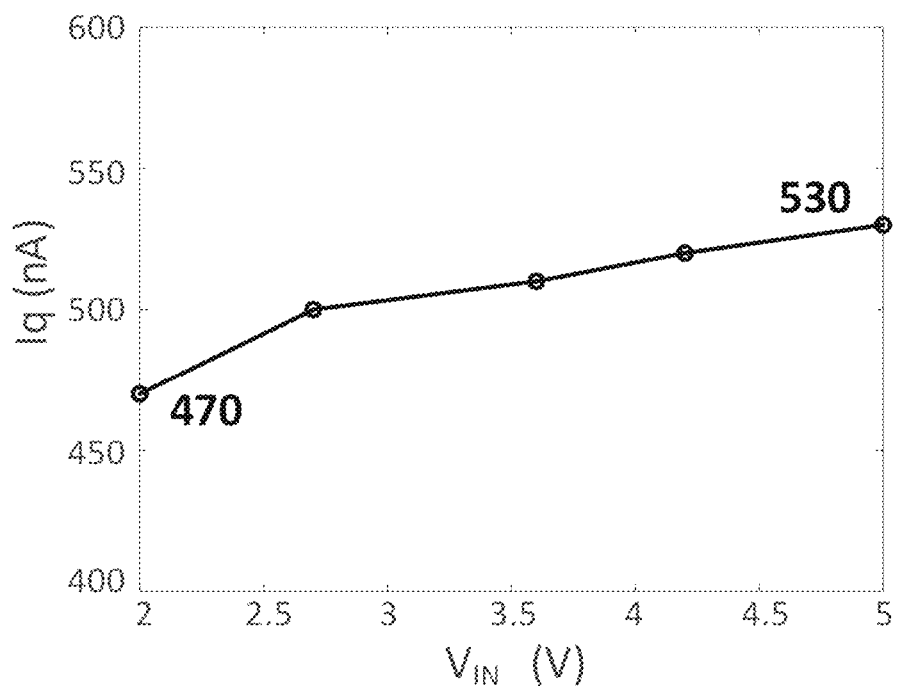
FIG. 20 shows a diagram for quiescent currents measured for different $V_{IN}$, when $V_{OUT}$=0.8 V, provided in an embodiment of the present disclosure.

In an embodiment of the present disclosure, a 5V thick oxide is selected to make prototype by using 0.18 μm CMOS, and an effective area of the prototype is 1×1.1 mm², including a protection ring (PAD ring). Due to the proposed DCT control mode and low-power-consumption DCT-to-PWM mode selection circuit, as shown in FIG. 20, when $V_{IN}$=2.0 V and $V_{OUT}$=0.8 V, the converter reaches $I_q$=470 nA.

Figure 21:
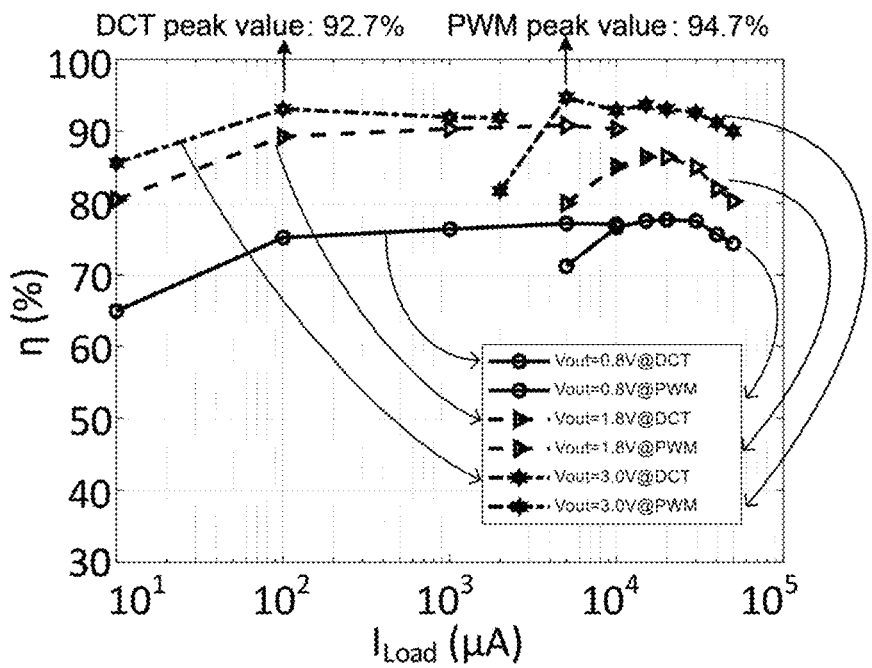
FIG. 21 shows a diagram for efficiencies measured for different $V_{OUT}$, when $V_{IN}$=3.6 V, provided in an embodiment of the present disclosure.

Referring to FIG. 21, FIG. 21 shows the efficiency measured when $V_{IN}$=3.6 V and $V_{OUT}$=0.8 V, 1.8 V, and 3.0 V and $I_{Load}$ is 10 μA to 50 mA. As can be seen from FIG. 21, when $V_{IN}$=3.6 V and $V_{OUT}$=3.0 V, and when $I_{Load}$=100 μA/5 mA, peak efficiencies of DCT/PWM is 92.7%/94.7%, respectively. When $V_{OUT}$=1.8 V and 3.0 V, the power efficiency is still greater than 80% in the range of 10 μA to 50 mA (5000×). When $V_{OUT}$=0.8 V, the conversion rate is lower, so the efficiency will be lower than the efficiency at high conversion rate, but the design can still achieve power efficiency greater than 70% in the range of 100 μA to 50 mA.

Figure 22:
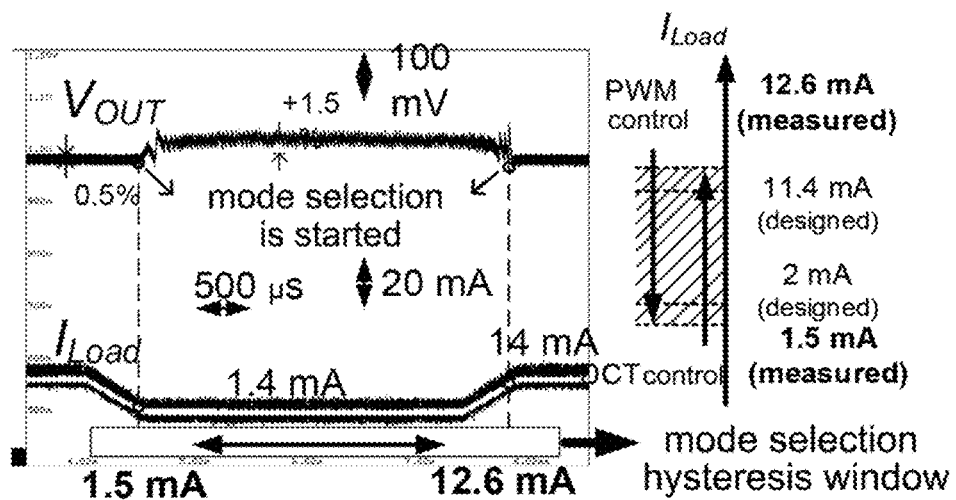
FIG. 22 shows a schematic view of a mode selection hysteresis window measured when $V_{IN}$=3.6 V, $V_{OUT}$=1 V, and $I_{Load}$ gradually changes between 1.4 mA and 14 mA provided in an embodiment of the present disclosure.

Referring to FIG. 22, FIG. 22 shows that the output voltage of the converter can still be adjusted to its reference voltage (with an accuracy within ±2%) when the $I_{Load}$ gradually changes between 1.4 mA and 14 mA, although the control mode has been automatically switched between the DCT control and the PWM control, which verifies the "seamless mode selection" in the present design. This figure also shows that the mode selection hysteresis window is between 1.5 mA and 12.6 mA, which is consistent with the design.

Figure 23:
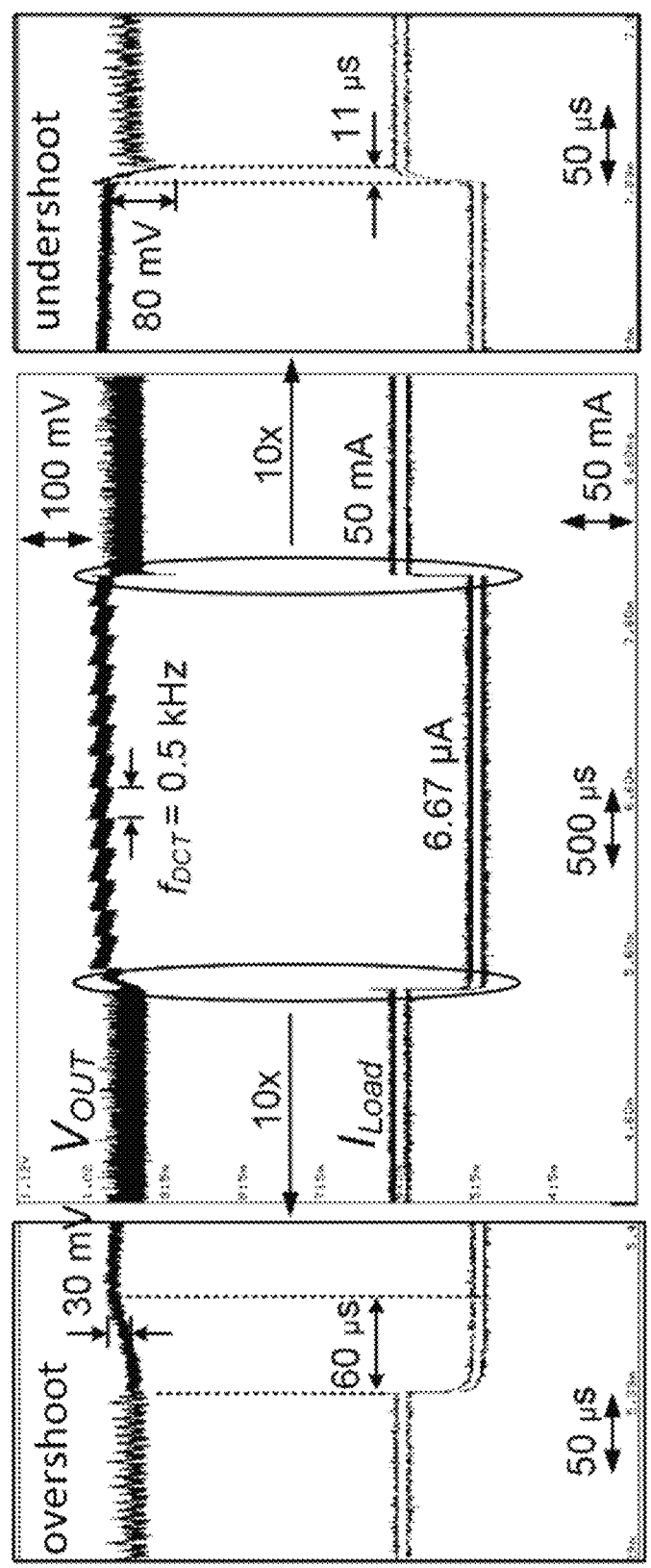
FIG. 23 shows a schematic view of $I_{Load}$ step change between 6.67 µA and 50 mA measured when $V_{IN}$=3.6 V and $V_{OUT}$=1 V provided in an embodiment of the present disclosure.

Referring to FIG. 23, FIG. 23 shows a load transient response of the present mode selection design between 6.67 μA and 50 mA, wherein recovery time is 11/60 μs, and an undershoot/overshoot voltage is 80 mV/30 mV.

Figure 24:
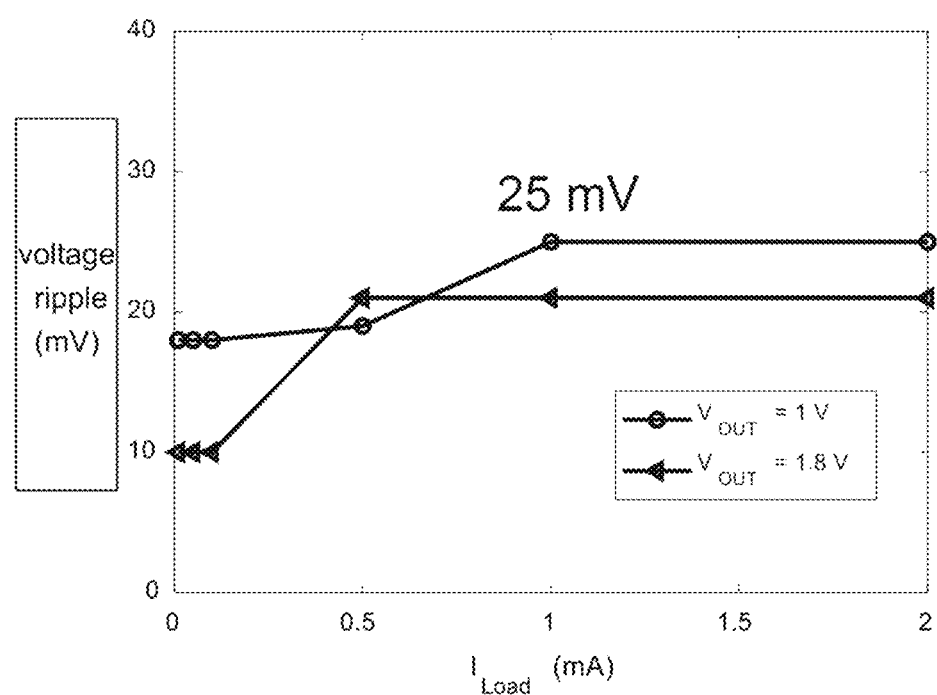
FIG. 24 shows a schematic diagram of output voltage ripples measured for different load currents when $V_{IN}$=3.6V and $V_{OUT}$=1 V and 1.8 V in the DCT control provided in an embodiment of the present disclosure.

Referring to FIG. 24, FIG. 24 shows output ripples measured for different load currents (10 μA to 2 mA) when $V_{IN}$=3.6 V, and $V_{OUT}$=1 V and 1.8 V, in the DCT control.

The undershoot voltage/load step in an embodiment of the present disclosure is 1.6 mV/mA, which is a lower level in the art. On the other hand, the load step/stability time (recovery speed) of the embodiment of the present disclosure is 4.54 mA/μs, which is a faster level in the art. The higher power efficiency and lower $I_q$ (including bandgap reference 701 circuit and internal oscillator) are realized in the larger $V_{IN}$ and $I_{Load}$ ranges in the embodiment of the present disclosure.

Finally, in an embodiment of the present disclosure, a DCT/PWM buck converter with a low quiescent current, a wide input/output voltage and load range, and seamless mode selection and conversion considerations is realized for IoT applications. The theoretical and working principles of the proposed low-power-consumption DCT control are also analyzed and discussed. A simple digital current detection circuit based on the counter 301 is designed for the DCT-to-PWM mode selection, without consuming any quiescent current. The PWM-to-DCT mode selection circuit and the hysteresis window are also realized so as to ensure smooth and stable conversion between the PWM and the DCT modes. Current mode PWM control is employed to extend the load current range and verify the proposed mode selection circuit design. The proposed buck converter (including bandgap, internal LDO, and oscillator) has a quiescent current of only 470 nA. The peak efficiencies reach 92.7% and 94.7% in the DCT and PWM control, respectively, the efficiency is greater than 80% in the range of 10 μA to 50 mA (5000×), with a wider input voltage range (2 V to 5 V) and a wider load current range (1 μA to 50 mA).

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "center", "upper", "lower", "left", "right", "vertical", "horizontal", "inner", and "outer" are based on orientation or positional relationships as shown in the figures, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms such as "first", "second", and "third" are merely for distinctive description, but should not be construed as indicating or implying importance in the relativity.

In the description of the present disclosure, it should be further illustrated that, unless otherwise specifically regulated and defined, the terms "set", "install", "link", and "connect" should be understood in a broad sense, for example, a connection may be a fixed connection, a detachable connection, or an integrated connection; it may be a mechanical connection or an electrical connection; it may be direct joining or indirect joining through an intermediary, and it also may be inner communication between two elements. For those ordinarily skilled in the art, specific meanings of the above-mentioned terms in the present disclosure could be understood according to specific circumstances.

Finally, it should be indicated that the embodiments above are merely for specific embodiments of the present disclosure, for illustrating the technical solutions of the present disclosure, rather than limiting the present disclosure. The scope of protection of the present disclosure should not be limited thereto. While the detailed description is made to the present disclosure with reference to the above-mentioned embodiments, those ordinarily skilled in the art should understand that the technical solutions recited in the above-mentioned embodiments still can be modified, or readily changed, or equivalent substitutions can be made to some of the technical features therein; these modifications, changes, or substitutions do not make the corresponding technical solutions essentially depart from the spirit and scope of the technical solutions of the embodiments of the present disclosure. They all should be covered within the scope of protection of the present disclosure. Therefore, the scope of protection of the present disclosure should be based on the scope of protection of the claims.

What is claimed is:

1. A control system for a buck converter, comprising: a first control module, a second control module, a mode selector, a driving and level shifter module, a power stage module, an inductor, a voltage stabilizing module, an inductor current zero-crossing detecting module and a voltage source, wherein the first control module is connected to the voltage source, the mode selector and the driving and level shifter module, respectively;

the second control module is connected to the voltage source, the mode selector and the driving and level shifter module, respectively;

the mode selector is further connected to the driving and level shifter module and the voltage source, respectively; the driving and level shifter module is further connected to the power stage module and the inductor current zero-crossing detecting module; the power stage module is further connected to the inductor, the inductor current zero-crossing detecting module and a voltage input terminal, respectively; the inductor is further connected to a voltage output terminal, the first control module and the second control module; the voltage stabilizing module has one terminal connected to the inductor, and the other terminal grounded; and the voltage source is further connected to the voltage input terminal;

the first control module is configured to output a first voltage pulse to the driving and level shifter module when an internet of thing (IOT) device is in a sleep mode or a standby mode, wherein a frequency of the first voltage pulse is determined by a frequency of a first clock in the first control module, and a width of the first voltage pulse is determined by a frequency of a second clock in the first control module;

the second control module is configured to output a second voltage pulse to the driving and level shifter module when the IOT device is in a transmission mode, wherein a frequency of the second voltage pulse is constant;

the mode selector is configured to detect an operating mode of the IOT device, turn off the first control module and turn on the second control module through a counter or a digital current sensor when the IOT device is switched from the sleep mode or the standby mode to the transmission mode, and turn on the first control module and turn off the second control module through a first voltage comparator corresponding to the digital current sensor in the mode selector when the IOT device is switched from the transmission mode to the sleep mode or the standby mode;

the driving and level shifter module is configured to control a switching frequency of the power stage module according to the first voltage pulse or the second voltage pulse, so as to cooperate with the inductor to convert an input voltage of the voltage input terminal to an output voltage;

the voltage stabilizing module is configured to reduce a ripple of the output voltage;

the inductor current zero-crossing detecting module is configured to detect whether a current of the inductor reaches a zero-crossing position, so as to modify a time of a voltage pulse of the power stage module through the driving and level shifter module, so that a current passing through the inductor is discontinuously conducted; and the voltage source is configured to provide a constant voltage to the first control module or the second control module according to the input voltage of the voltage input terminal.

2. The control system for a buck converter according to claim 1, wherein the first control module comprises: a first feedback sub-module, a first control sub-module and a clock sub-module, wherein the first feedback sub-module is configured to provide a first feedback voltage to the first control sub-module;

the first control sub-module is configured to control the clock sub-module according to the first feedback voltage and a reference voltage provided by the voltage source; and the clock sub-module is configured to generate the first clock and the second clock.

3. The control system for a buck converter according to claim 2, wherein the first control sub-module comprises: a clock-controlled comparator and an exclusive OR gate, wherein a positive input terminal of the clock-controlled comparator is connected to the voltage source, a negative input terminal of the clock-controlled comparator is connected to the first feedback sub-module, a clock-controlled terminal of the clock-controlled comparator is connected to an output terminal of the exclusive OR gate, and an output terminal of the clock-controlled comparator is connected to the clock sub-module;

an input terminal of the exclusive OR gate is connected to the clock sub-module; and the clock-controlled terminal of the clock-controlled comparator is configured to turn on or turn off the clock-controlled comparator, and the clock-controlled comparator is configured to compare the reference voltage with the first feedback voltage, output high when the first feedback voltage is less than the reference voltage, and output low when the first feedback voltage is greater than the reference voltage.

4. The control system for a buck converter according to claim 3, wherein the clock sub-module comprises: a first clock generator, an AND gate and a second clock generator, wherein one input terminal of the AND gate is connected to the clock-controlled comparator, the other input terminal of the AND gate is connected to the mode selector, an output terminal of the AND gate is connected to the second clock generator, and the second clock generator is connected to one input terminal of the exclusive OR gate;

the first clock generator is connected to the other input terminal of the exclusive OR gate; and the first clock generator is configured to generate the first clock; and the second clock generator is configured to generate the second clock.

5. The control system for a buck converter according to claim 1, wherein the second control module comprises: a second feedback sub-module and a second control sub-module, wherein the second feedback sub-module is configured to provide a second feedback voltage to the second control sub-module; and the second control sub-module is configured to output the second voltage pulse according to the second feedback voltage and the reference voltage provided by the voltage source.

6. The control system for a buck converter according to claim 5, wherein the second control sub-module comprises: a second voltage comparator and an error amplifier, wherein one input terminal of the second voltage comparator is connected to an output terminal of the error amplifier, the other input terminal of the second voltage comparator is connected to a superposition signal of a gain signal of an input current and a third clock signal, and an output terminal of the second voltage comparator is configured to output the second voltage pulse; and one input terminal of the error amplifier is connected to the voltage source, and the other input terminal of the error amplifier is connected to the second feedback sub-module.

7. The control system for a buck converter according to claim 1, wherein the mode selector comprises: a counter, a selector, an OR gate, a first NOT gate, a second NOT gate, a first voltage comparator and a voltage divider network, wherein the counter is connected to input terminals of the selector;

an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal for turning on the first control module and turning off the second control module;

an input terminal of the first NOT gate is connected to an output terminal of the second NOT gate;

an input terminal of the second NOT gate is connected to an output terminal of the first voltage comparator; and one input terminal of the first voltage comparator is connected to one terminal of the voltage divider network, and the other input terminal of the first voltage comparator is connected to a sampling signal of a current of the inductor.

8. The control system for a buck converter according to claim 7, wherein the counter comprises a plurality of cascaded D flip-flops.

9. The control system for a buck converter according to claim 1, wherein the voltage source comprises a bandgap reference and low dropout voltage regulators, and the voltage source provides a constant voltage to the first control module or the second control module through the bandgap reference and the low dropout voltage regulators.

10. The control system for a buck converter according to claim 9, wherein the low dropout voltage regulators comprise a first low dropout voltage regulator and a second low dropout voltage regulator, wherein the voltage source provides a constant voltage to the first control module through the bandgap reference and the first low dropout voltage regulator, and the voltage source provides a constant voltage to the second control module through the bandgap reference and the second low dropout voltage regulator.

11. The control system for a buck converter according to claim 2, wherein the second control module comprises: a second feedback sub-module and a second control sub-module, wherein
the second feedback sub-module is configured to provide a second feedback voltage to the second control sub-module; and
the second control sub-module is configured to output the second voltage pulse according to the second feedback voltage and the reference voltage provided by the voltage source.

12. The control system for a buck converter according to claim 3, wherein the second control module comprises: a second feedback sub-module and a second control sub-module, wherein
the second feedback sub-module is configured to provide a second feedback voltage to the second control sub-module; and
the second control sub-module is configured to output the second voltage pulse according to the second feedback voltage and the reference voltage provided by the voltage source.

13. The control system for a buck converter according to claim 4, wherein the second control module comprises: a second feedback sub-module and a second control sub-module, wherein
the second feedback sub-module is configured to provide a second feedback voltage to the second control sub-module; and
the second control sub-module is configured to output the second voltage pulse according to the second feedback voltage and the reference voltage provided by the voltage source.

14. The control system for a buck converter according to claim 2, wherein the mode selector comprises: a counter, a selector, an OR gate, a first NOT gate, a second NOT gate, a first voltage comparator and a voltage divider network, wherein
the counter is connected to input terminals of the selector;
an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal for turning on the first control module and turning off the second control module;
an input terminal of the first NOT gate is connected to an output terminal of the second NOT gate;
an input terminal of the second NOT gate is connected to an output terminal of the first voltage comparator; and
one input terminal of the first voltage comparator is connected to one terminal of the voltage divider network, and the other input terminal of the first voltage comparator is connected to a sampling signal of a inductor current.

15. The control system for a buck converter according to claim 3, wherein the mode selector comprises: a counter, a selector, an OR gate, a first NOT gate, a second NOT gate, a first voltage comparator and a voltage divider network, wherein
the counter is connected to input terminals of the selector;
an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal to turning on the first control module and turning off the second control module;
an input terminal of the first NOT gate is connected to an output terminal of the second NOT gate;
an input terminal of the second NOT gate is connected to an output terminal of the first voltage comparator; and
one input terminal of the first voltage comparator is connected to one terminal of the voltage divider network, and the other input terminal of the first voltage comparator is connected to a sampling signal of a current of the inductor.

16. The control system for a buck converter according to claim 4, wherein the mode selector comprises: a counter, a selector, an OR gate, a first NOT gate, a second NOT gate, a first voltage comparator and a voltage divider network, wherein
the counter is connected to input terminals of the selector;
an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal for turning on the first control module and turning off the second control module;
an input terminal of the first NOT gate is connected to an output terminal of the second NOT gate;
an input terminal of the second NOT gate is connected to an output terminal of the first voltage comparator; and
one input terminal of the first voltage comparator is connected to one terminal of the voltage divider network, and the other input terminal of the first voltage comparator is connected to a sampling signal of a current of the inductor.

17. The control system for a buck converter according to claim 5, wherein the mode selector comprises: a counter, a selector, an OR gate, a first NOT gate, a second NOT gate, a first voltage comparator and a voltage divider network, wherein
the counter is connected to input terminals of the selector;
an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal for turning on the first control module and turning off the second control module;
an input terminal of the first NOT gate is connected to an output terminal of the second NOT gate;
an input terminal of the second NOT gate is connected to an output terminal of the first voltage comparator; and
one input terminal of the first voltage comparator is connected to one terminal of the voltage divider network, and the other input terminal of the first voltage comparator is connected to a sampling signal of a current of the inductor.

18. The control system for a buck converter according to claim 6, wherein the mode selector comprises: a counter, a selector, an OR gate, a first NOT gate, a second NOT gate, a first voltage comparator and a voltage divider network, wherein the counter is connected to input terminals of the selector;

an output terminal of the selector is connected to one input terminal of the OR gate, the other input terminal of the OR gate is connected to an output terminal of the first NOT gate, and an output terminal of the OR gate is configured to output a control signal for turning off the first control module and turning on the second control module, or to output a control signal for turning on the first control module and turning off the second control module;

an input terminal of the first NOT gate is connected to an output terminal of the second NOT gate;

an input terminal of the second NOT gate is connected to an output terminal of the first voltage comparator; and one input terminal of the first voltage comparator is connected to one terminal of the voltage divider network, and the other input terminal of the first voltage comparator is connected to a sampling signal of a current of the inductor.

19. The control system for a buck converter according to claim 2, wherein the voltage source comprises a bandgap reference and low dropout voltage regulators, and the voltage source provides a constant voltage to the first control module or the second control module through the bandgap reference and the low dropout voltage regulators.

20. The control system for a buck converter according to claim 3, wherein the voltage source comprises a bandgap reference and low dropout voltage regulators, and the voltage source provides a constant voltage to the first control module or the second control module through the bandgap reference and the low dropout voltage regulators.

\* \* \* \* \*